United States Patent
Patel et al.

(10) Patent No.: US 10,171,216 B2
(45) Date of Patent: Jan. 1, 2019

(54) DOWNLINK CONTROL FOR DEMODULATION REFERENCE SIGNAL TRANSMISSIONS

(71) Applicant: QUALCOMM Incorporated, San Diego, CA (US)

(72) Inventors: Shimman Patel, San Diego, CA (US); Wanshi Chen, San Diego, CA (US); Seyedkianoush Hosseini, San Diego, CA (US); Hao Xu, San Diego, CA (US); Peter Gaal, San Diego, CA (US); Jing Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/457,900

(22) Filed: Mar. 13, 2017

(65) Prior Publication Data

US 2017/0294999 A1 Oct. 12, 2017

Related U.S. Application Data

(60) Provisional application No. 62/320,047, filed on Apr. 8, 2016.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04L 1/0003* (2013.01);
(Continued)

(58) Field of Classification Search
CPC ........................................................ H04L 5/00
(Continued)

(56) References Cited

U.S. PATENT DOCUMENTS

| 8,467,469 | B2 | 6/2013 | Lee et al. |
| 8,774,224 | B2 | 7/2014 | Lee et al. |

(Continued)

FOREIGN PATENT DOCUMENTS

KR 20130007327 A 1/2013

OTHER PUBLICATIONS

Huawei et al., "PDCCH Design for Short TTI", 3GPP TSG RAN WG1 Meeting #84bis, R1-162109, Apr. 2, 2016, XP051079956, Retrieved from the Internet: URL:http://www.3gpp.org/ftp/tsg_ran/WG1_RL1/TSGR1_84b/Docs/ [retrieved on Apr. 2, 2016], 4 pages.
(Continued)

*Primary Examiner* — Michael T Vu
(74) *Attorney, Agent, or Firm* — Arent Fox, LLP

(57) ABSTRACT

The present disclosure provides a unique control region that is mapped to each data region for DL DMRS transmissions. In addition, the present disclosure provides an updated DCI format that may include DL DMRS transmissions. The apparatus may receive a first content during a first TTI. In an aspect, the content may include at least a control region which includes a DMRS. In addition, a location of the DMRS may be defined by either a closed-loop precoding structure or an open-loop precoding structure. Furthermore, the duration of the first TTI may be shorter than 1 ms. The apparatus may demodulate the control region based at least on the DMRS.

60 Claims, 15 Drawing Sheets

(51) Int. Cl.
| | |
|---|---|
| *H04L 1/00* | (2006.01) |
| *H04W 72/04* | (2009.01) |
| *H04W 72/14* | (2009.01) |
| *H04B 7/0452* | (2017.01) |
| *H04B 7/0413* | (2017.01) |

(52) U.S. Cl.
CPC .......... *H04L 1/0018* (2013.01); *H04L 5/0044* (2013.01); *H04L 5/0051* (2013.01); *H04L 5/0053* (2013.01); *H04L 5/0094* (2013.01); *H04W 72/042* (2013.01); *H04W 72/14* (2013.01); *H04B 7/0413* (2013.01); *H04B 7/0452* (2013.01); *H04L 5/0007* (2013.01); *H04W 72/0446* (2013.01)

(58) Field of Classification Search
USPC .............................................. 455/452.1–453
See application file for complete search history.

(56) References Cited

U.S. PATENT DOCUMENTS

| | | | |
|---|---|---|---|
| 8,908,651 B2 | 12/2014 | Noh et al. | |
| 9,497,006 B2 | 11/2016 | Chung et al. | |
| 9,872,302 B2* | 1/2018 | Jongren | H04W 72/082 |
| 2017/0171842 A1* | 6/2017 | You | H04L 5/0048 |

OTHER PUBLICATIONS

International Search Report and Written Opinion—PCT/US2017/022334—ISA/EPO—dated Jun. 7, 2017.

LG Electronics: "Reference Signal for sPDSCH Demodulation", 3GPP TSG RAN WG1 Meeting #84bis, R1-162505, Apr. 2, 2016, XP051080241, Retrieved from the Internet: URL:http://www.3gpp.org/ftp/tsg_ran/WG1_RL1/TSGR1_84b/Docs/, 9 pages.

NTT Docomo et al., "DL channel designs for shortened TTI", 3GPP Draft; R1-163171, 3rd Generation Partnership Project (3GPP), Mobile Competence Centre; 650, Route Des Lucioles ; F-06921 Sophia-Antipolis Cedex; France, Apr. 1, 2016, XP051079876, Retrieved from the Internet: URL:http://www.3gpp.org/ftp/tsg_ran/WG1_RL1/TSGR1_84b/Docs/.

* cited by examiner

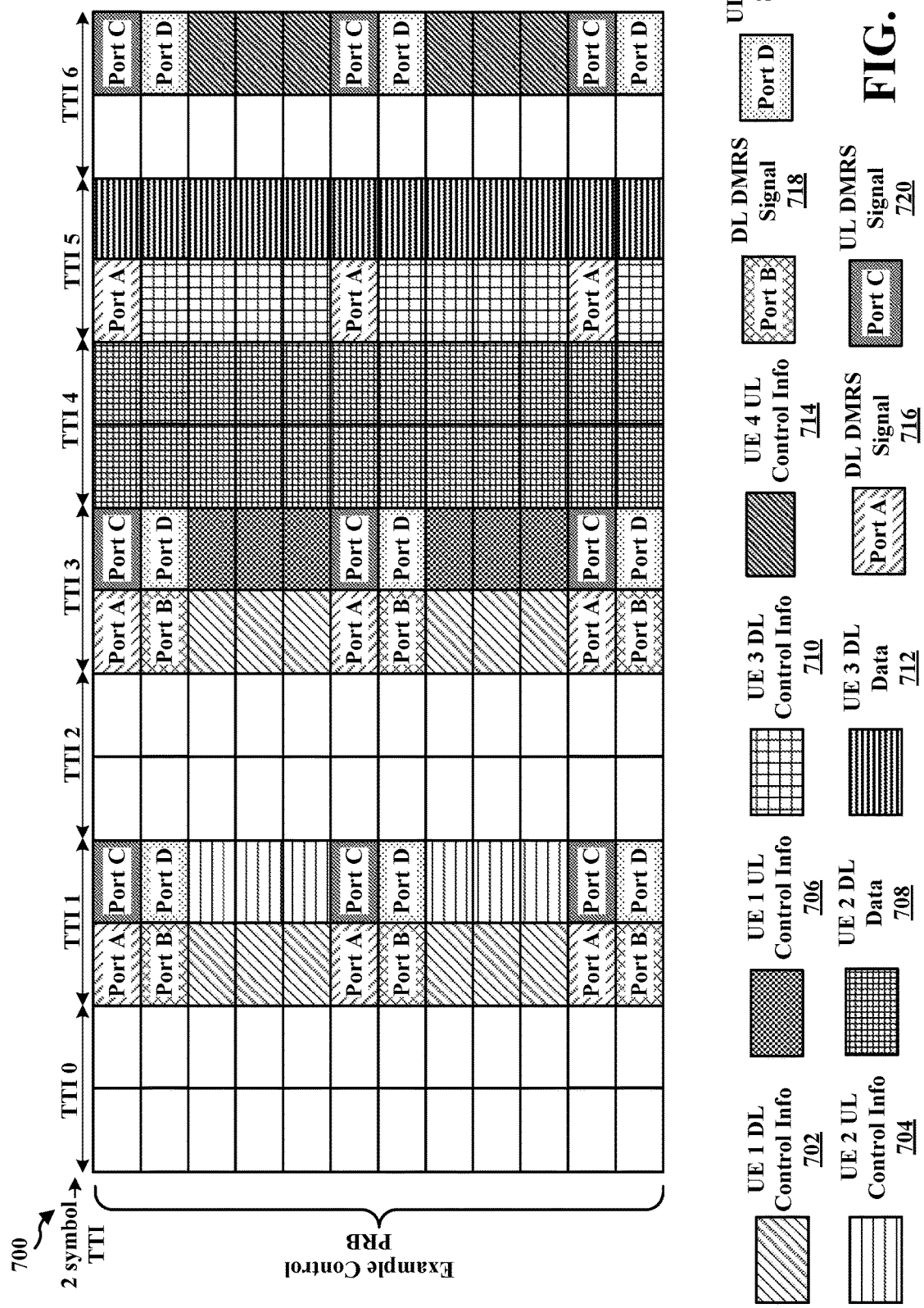

DOWNLINK CONTROL FOR DEMODULATION REFERENCE SIGNAL TRANSMISSIONS

CROSS-REFERENCE TO RELATED APPLICATION(S)

This application claims the benefit of U.S. Provisional Application Ser. No. 62/320,047, entitled "DOWNLINK CONTROL FOR DEMODULATION REFERENCE SIGNAL TRANSMISSIONS" and filed on Apr. 8, 2016, which is expressly incorporated by reference herein in its entirety.

BACKGROUND

Field

The present disclosure relates generally to communication systems, and more particularly, to control information for demodulation reference signal (DMRS) based downlink (DL) transmissions in ultra-low latency (ULL) communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In some wireless communication systems, certain user equipments (UEs) may communicate using ULL operations. ULL communications may include a control structure for cell-specific reference signals (CRS)-based transmissions that may not be directly extended to DL DMRS-based transmissions. There is an unmet need for a control structure that enables efficient DMRS-based transmissions in ULL communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some wireless communication systems, certain UEs may communicate using ULL operations. ULL communications may include a control structure for CRS-based transmissions that may not be directly extended to DL DMRS-based transmissions. CRS-based transmission design may include a control region that is embedded into a DL data region. However, having a control region that is embedded into a DL data region may not perform well for DL DMRS-based transmissions. For example, DMRS pilot signals that are optimized for the DL data of a first UE may not be optimized for a second UE receiving uplink (UL) control information in the same ULL block assignment.

In order to provide a solution to the problem, the present disclosure provides a unique control region that is mapped to each data region for DL DMRS transmissions. In addition, the present disclosure provides an updated downlink control information (DCI) format that includes DL DMRS transmissions.

Systems, methods, and apparatuses for DL control for DMRS based transmissions are described. In an aspect of the disclosure, a method, a computer-readable medium, and an apparatus are provided. The apparatus may receive a first content during a first transmission time interval (TTI). In an aspect, the first content may include at least a control region which includes a DMRS. In addition, a location of the DMRS may be defined by either a closed-loop precoding structure or an open-loop precoding structure. Furthermore, the duration of the first TTI may be shorter than 1 ms. The apparatus may demodulate the control region based at least on the DMRS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7A illustrates a close-loop precoding structure in accordance with certain aspects of the present disclosure.

DETAILED DESCRIPTION

Figure 1:
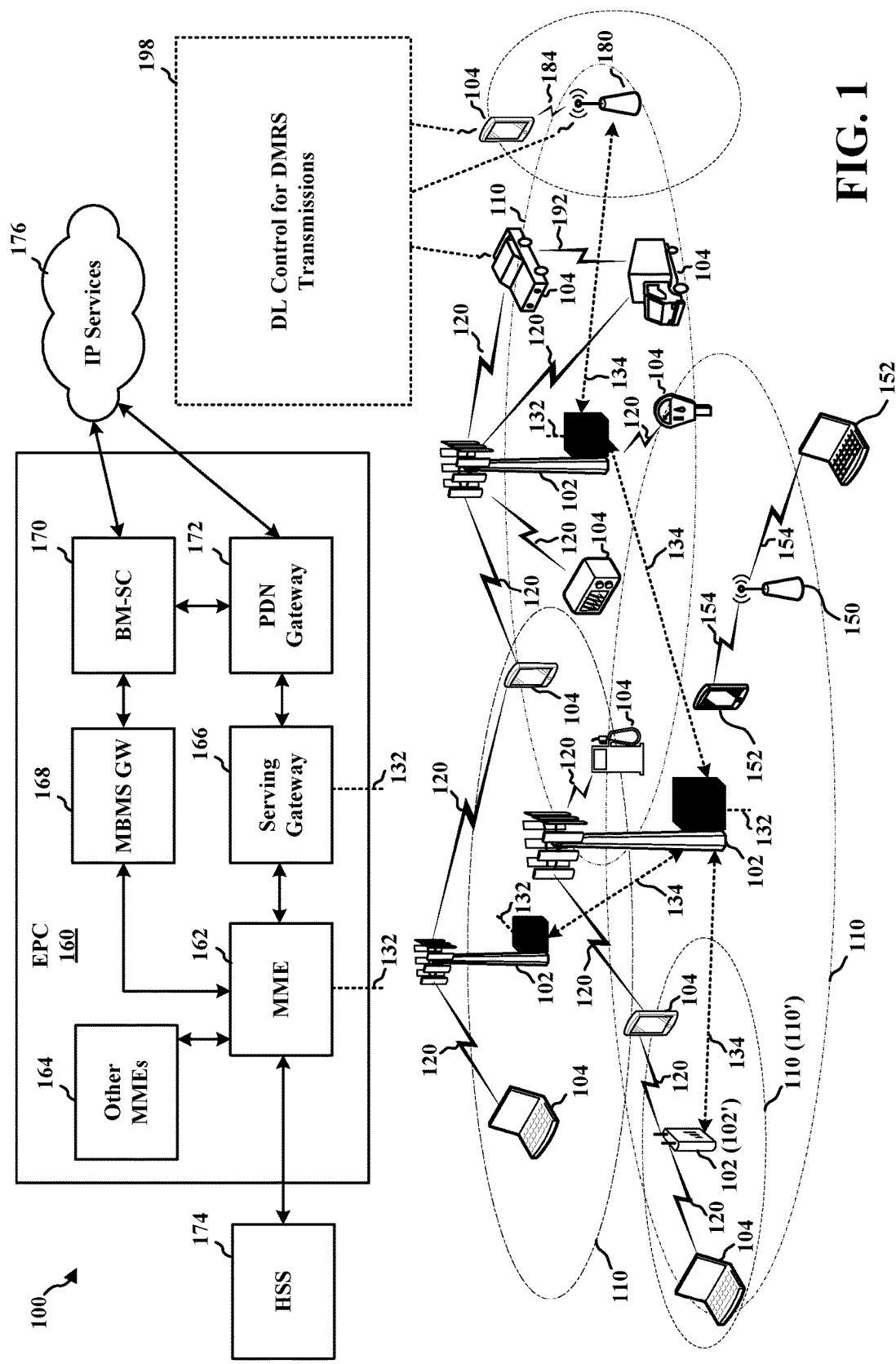
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive DL control for DMRS transmissions (198).

Figure 2:
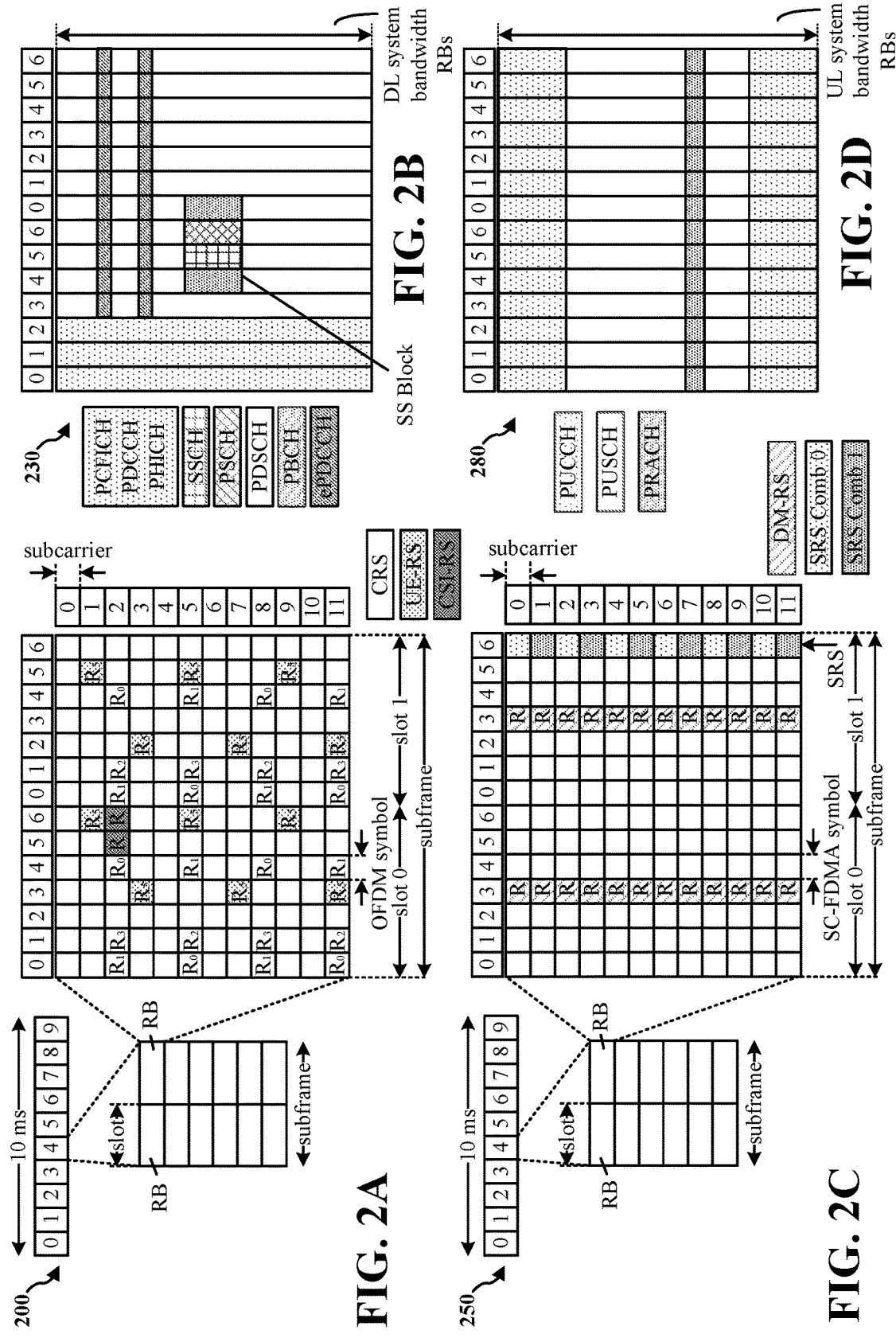
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
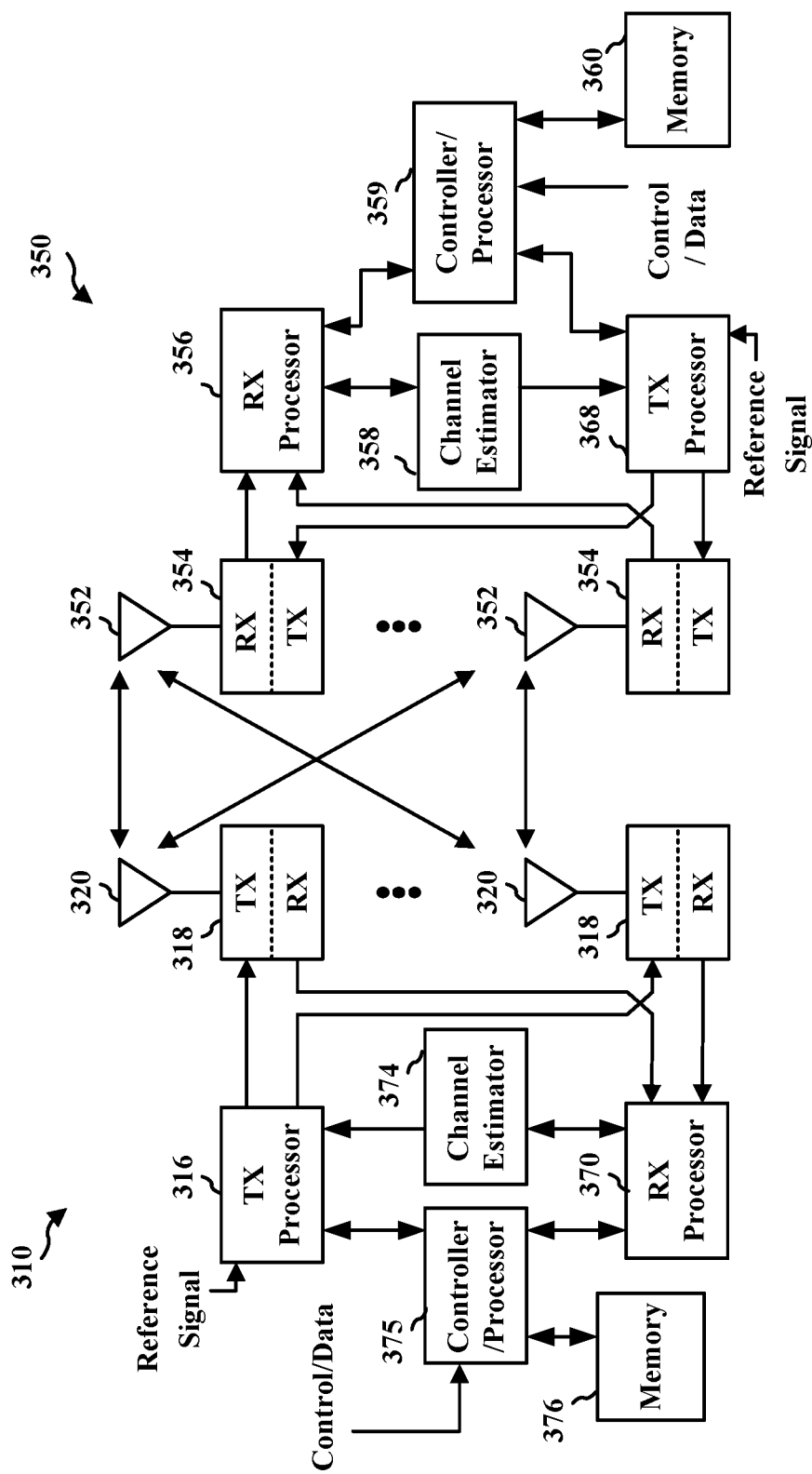
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some wireless communication systems, certain UEs may communicate using ULL operations. Such communications may include a control structure for CRS-based transmissions that may not be directly extended to DL DMRS-based transmissions. CRS-based transmission design may include a control region that is embedded into a DL data region. However, a configuration with a control region embedded into a DL data region may not perform well for DL DMRS-based transmissions. For example, DMRS pilot signals that are optimized for the DL data of a first UE may not be optimized for a second UE receiving UL control information in the same ULL block assignment.

In order to provide a solution to the problem, the present disclosure provides a unique control region that may be mapped to each data region for DL DMRS transmissions. In addition, the present disclosure provides an updated DCI format that may include DL DMRS transmissions.

Figure 4:
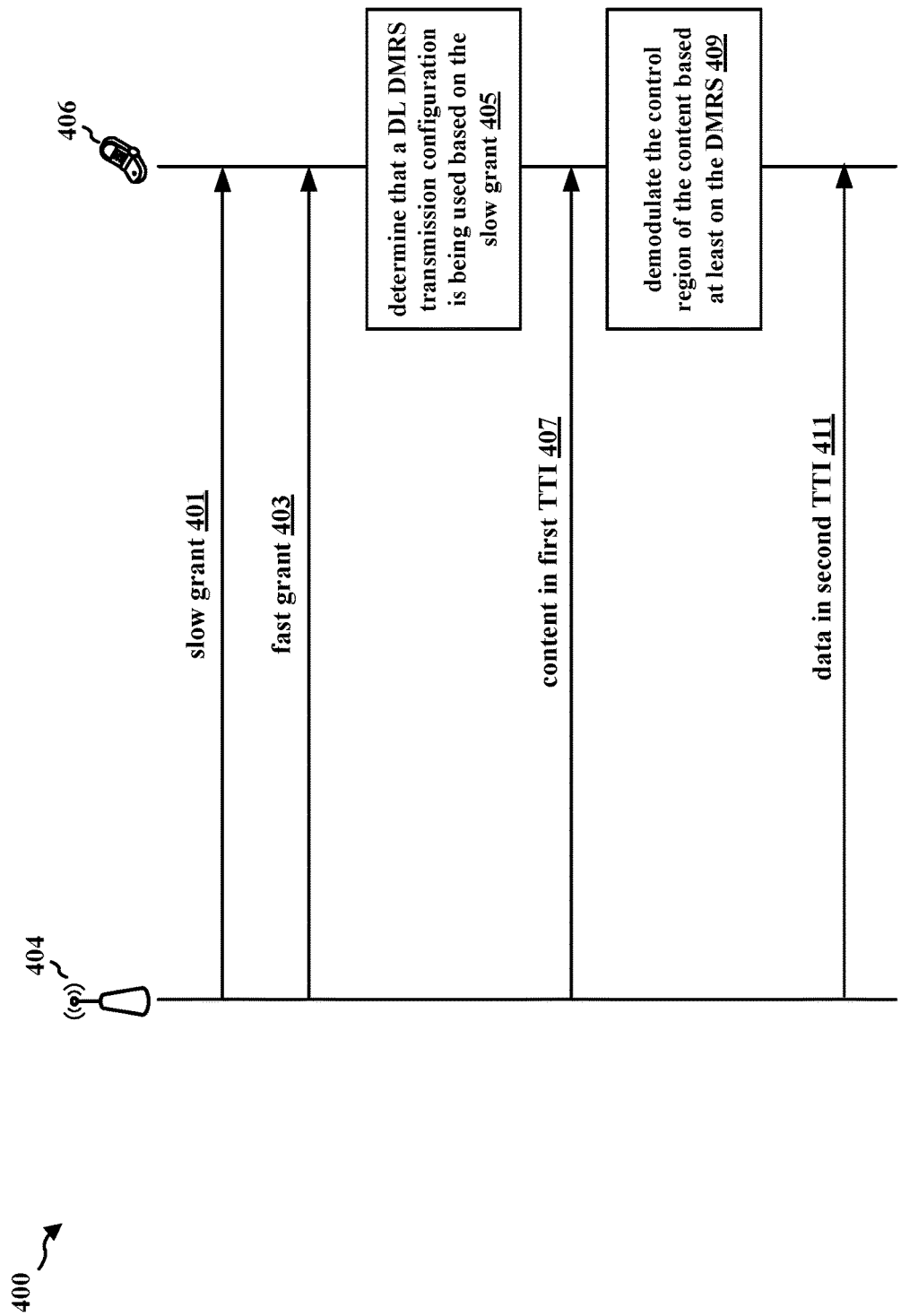
FIG. 4 is a data flow that may be used in a communications system in accordance with certain aspects of the present disclosure.

FIG. 4 is a diagram of a data flow 400 for a ULL communication system in accordance with one aspect of the present disclosure. The ULL communications system may include an eNB 404 in communication with a UE 406. To reduce control overhead in the ULL communication system, information such as the MCS may be signaled to the UE 406 in a slow grant 401 (e.g., every millisecond), and information that indicates a physical resource block (PRB) location and control region/data region mapping may be signaled to the UE 406 in a fast grant 403 (e.g., more frequently than every millisecond). Based on the slow grant 401, the UE 406 may determine 405 that a DL DMRS transmission configuration is being used by the eNB 404.

In one aspect, the UE 406 may receive, from the eNB 404, content 407 during a first TTI. For example, the duration of the first TTI may be shorter than 1 ms. In an aspect, the content may include at least a control region which includes a DMRS. The UE 406 may demodulate 409 the control region based at least on the DMRS.

In one aspect, the control region may include one or more DL or UL data grants. For example, the one or more DL or UL data grants include a first grant associated with a first data region for the first UE and a second grant associated with a second data region for a second UE (e.g., not illustrated in FIG. 4). In other words, the one or more DL or UL data grants may provide a mapping between control regions and data regions. In addition, one or more of the DL or UL data grants may be is mapped to DMRS received from the eNB 404. In certain configurations, the control region may include a DL grant for a second TTI. Here, the DL grant may allocate both control and data regions associated with the second TTI for DL data reception 411. Further details of the mapping of DMRS to DL or UL data grants are discussed infra with respect to FIGS. 5, 6A, 6B, 6C, and 6D.

Figure 5:
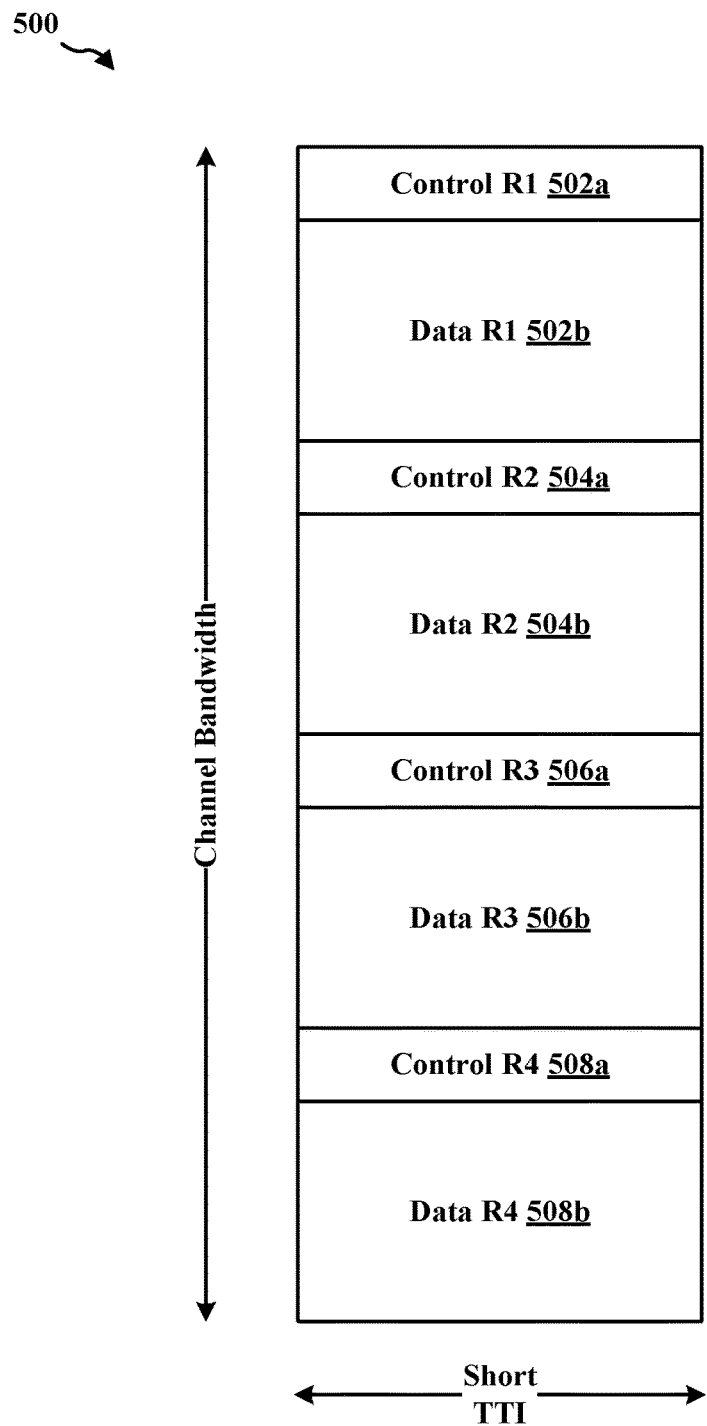
FIG. 5 is a diagram of a short TTI that includes a separate control region mapped to separate data regions in accordance with certain aspects of the present disclosure.

FIG. 5 is a diagram of a short TTI 500 that includes a separate control region mapped to each data region. For example, the short TTI 500 illustrated in FIG. 5 may be used for DL DMRS transmissions. One or more control regions and data regions for a short TTI may be allocated for a given channel bandwidth.

In the example embodiment illustrated in FIG. 5, the channel bandwidth of the short TTI 500 includes four separate control regions, each separately mapped to a different data region. For example, control region R1 502a (e.g., Control R1) is mapped to data region R1 502b (e.g., Data R1), control region R2 504a (e.g., Control R2) is mapped to data region R2 504b (e.g., Data R2), control region R3 560a (e.g., Control R3) is mapped to data region R3 506b (e.g., Data R3), and control region R4 508a (e.g., Control R4) is mapped to data region R4 508b (e.g., Data R4). In one aspect, the location of each of Control R1 502a, Control R2 504a, Control R3 506a, and Control R4 508a may be signaled to the UE 406 by a higher layer configuration.

The UE 406 may attempt to decode/demodulate 409 each of the control regions based on DMRS. If a control region is successfully decoded/demodulated 409, then the UE 406 may attempt to decode/demodulate the corresponding data region. For example, if Control R1 502a is successfully decoded/demodulated, then the UE 406 may attempt to decode/demodulated Data R1 502*b*.

In an alternative embodiment, the UE 406 may be assigned to multiple data regions from single control region (e.g., a multiblock assignment). For example, Control R1 502*a* may assign the UE 406 to Data R1 and additionally to any combination of Data R2 504*b*, Data R3 506*b*, and/or Data R4 508*b*. To minimize overhead in a multiblock assignment, an unused control region may be converted into a data region. For example, if Control R1 502*a* assigns the UE 406 to Data R1 502*b* and Data R2 506*b*, Control R2 504*a* may be converted as part of Data R2 504*b*.

Figure 6A:
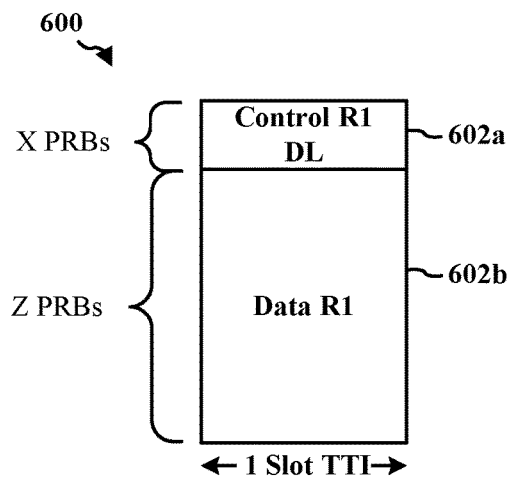
FIGS. 6A-6D each illustrate a short TTI that includes a separate control region mapped to separate data regions in accordance with certain aspects of the present disclosure.

FIG. 6A illustrates a single slot TTI 600 that includes a DL grant for UE 1. For example, the single slot TTI 600 illustrated in FIG. 6A includes a DL grant 602*a* for UE 1 in control region R1 (e.g., Control R1). The DL grant 602*a* may include rate matching information for corresponding data region R1 602*b* (e.g., Data R1). In the example illustrated in FIG. 6A, Control R1 may include X number of PRBs, and Data R1 may include Z number of PRBs. Here, X and Z may be the same number of PRBs or a different number of PRBs.

Figure 6B:
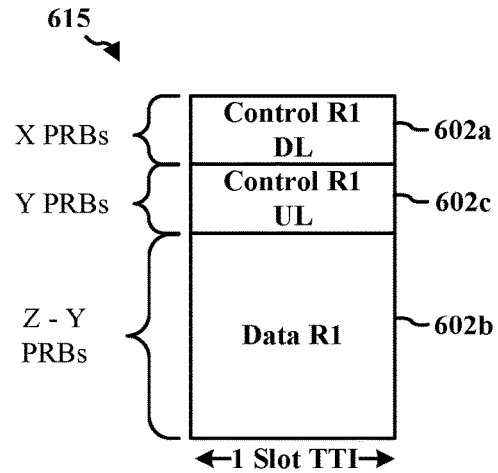

FIG. 6B illustrates a single slot TTI 615 that includes a DL grant for UE 1 and an UL grant for UE 2. For example, the single slot TTI 615 illustrated in FIG. 6B includes a DL grant 602*a* for UE 1 and an UL grant 602*c* in control region R1 (e.g., Control R1). The DL grant 602*a* may include rate matching information for corresponding data region R1 602*b* (e.g., Data R1). In the example illustrated in FIG. 6B, the DL grant 602*a* may include X number of PRBs in Control R1 and the UL grant 602*c* may include Y number of PRBs in Control R1. Thus, Control R1 includes X+Y number of PRBs. Here, X and Y may be the same number of PRBs or a different number of PRBs. The Data R1 602*b* may include Z−Y PRBs.

Figure 6C:
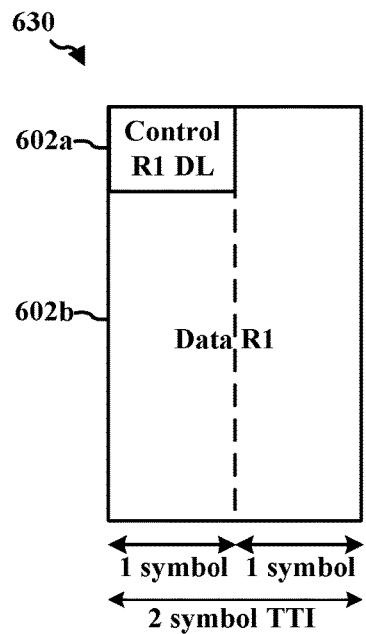

FIG. 6C illustrates a two symbol TTI 630 that includes a DL grant 602*a* for UE 1. For example, the two symbol TTI 630 illustrated in FIG. 6C includes a DL grant 602*a* for UE 1 in control region R1 (e.g., Control R1) located in the first symbol in the two symbol TTI 630 (e.g., at the start of the TTI). By positioning the DL grant 602*a* at the start of the two symbol TTI 630, a larger processing time for HARQ may be possible. In addition, data region R1 602*b* (e.g., Data R1) may be located in the first symbol and the second symbol in the two symbol TTI 630.

Figure 6D:
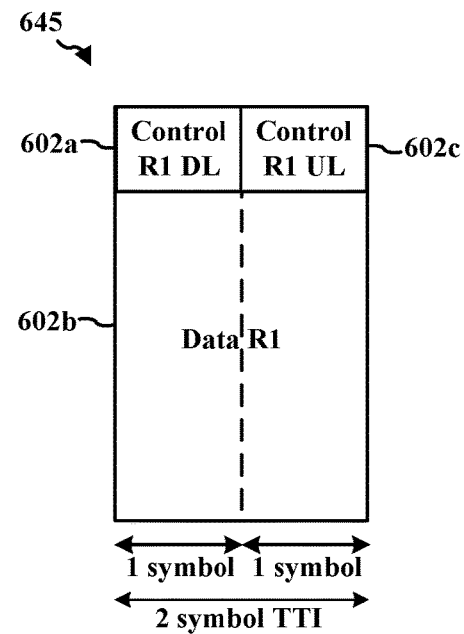

FIG. 6D illustrates a two symbol TTI 645 that includes a DL grant for UE 1 and a UL grant for UE2. For example, the two symbol TTI 645 illustrated in FIG. 6D includes a DL grant 602*a* for UE 1 in control region R1 (e.g., Control R1) located in the first symbol in the two symbol TTI 645 (e.g., at the start of the two symbol TTI 645). In addition, a UL grant 602*b* for UE 2 in Control R1 is located in the second symbol of the two symbol TTI 645. By positioning the DL grant 602*a* at the start of the two symbol TTI 645 and the UL grant 602*b* at the end of the TTI, a larger processing time for HARQ may be possible. In addition, data region R1 602*b* (e.g., Data R1) may be located in the first symbol and the second symbol in the two symbol TTI 645.

Referring again to FIG. 4, the content 407 may include a location of the DMRS that is defined by either a closed-loop precoding structure or an open-loop precoding structure.

With respect to the closed-loop precoding structure, DMRS pilot signals may be used for specific user(s). The DMRS pilot signals may be included in the control region of the TTI that contains a grant for a specific user. In the closed-loop precoding structure, a control region that is shared between multiple users may require a multi-user MIMO (MU-MIMO) configuration. Additional details of the closed-loop precoding structure are discussed infra with respect to FIG. 7A.

FIG. 7A illustrates a control PRB 700 in which the DMRS location is defined with a closed-loop precoding structure. Seven different TTIs (e.g., TTI 0, TTI 1, TTI 2, TTI 3, TTI 4, TTI 5, and TTI 6) that each include two symbols are illustrated in the control PRB 700 of FIG. 7A. The control PRB 700 may include UE 1 DL control information 702, UE 2 UL control information 704, UE 1 UL control information 706, UE 2 DL data 708, UE 3 DL control information 710, UE 3 DL data 712, and UE 4 UL control information 714. A UE receiving DL data in a particular TTI may receive a control grant that includes one or more DMRS pilot signals. The location of DMRS pilot signals may be an RE which is mapped to a single port (e.g., port A 716, port B 718, port C 720, and/or port D 722). The DMRS ports (e.g., port A 716, port B 718, port C 720, and port D 722) may be optimized via CSI information.

In the example illustrated in FIG. 7A, in TTI 1, UE 1 may be allocated resources for the DL and UE 2 may be allocated resources for the UL. In certain configurations, separate ports may be used for the DMRS pilot signals for UE 1 and UE 2. For example, DMRS pilot signals for UE 1 may be received on port A 716 and port B 718, and DMRS pilot signals for UE 2 may be received on port C 720 and port D 722.

As seen in FIG. 7A, in TTI 3, UE 1 may be allocated resources for both the DL and UL. Here, DMRS pilot signals for the DL may be received on port A 716 and port B 718, and DMRS pilot signals for the UL may be received on port C 720 and port D 722.

As seen in FIG. 7A, in TTI 4, UE 2 may receive DL data with resources that are allocated in a different PRB that is not illustrated in FIG. 7A.

As seen in FIG. 7A, in TTI 5, UE 3 may be allocated resources for the DL. In the example illustrated in FIG. 7A, DMRS pilot signals may be received on a single port (e.g., port A 716). Since no UL grant is present in TTI 5, UE 3 DL control information 710 may contain rate matching information to allocate UL control REs for UE 3 DL data 712.

As seen in FIG. 7A, in TTI 6, UE 4 may be allocated resources for the UL. Here, DMRS pilot signals for the UL may be received on port C 720 and port D 722.

Figure 7B:
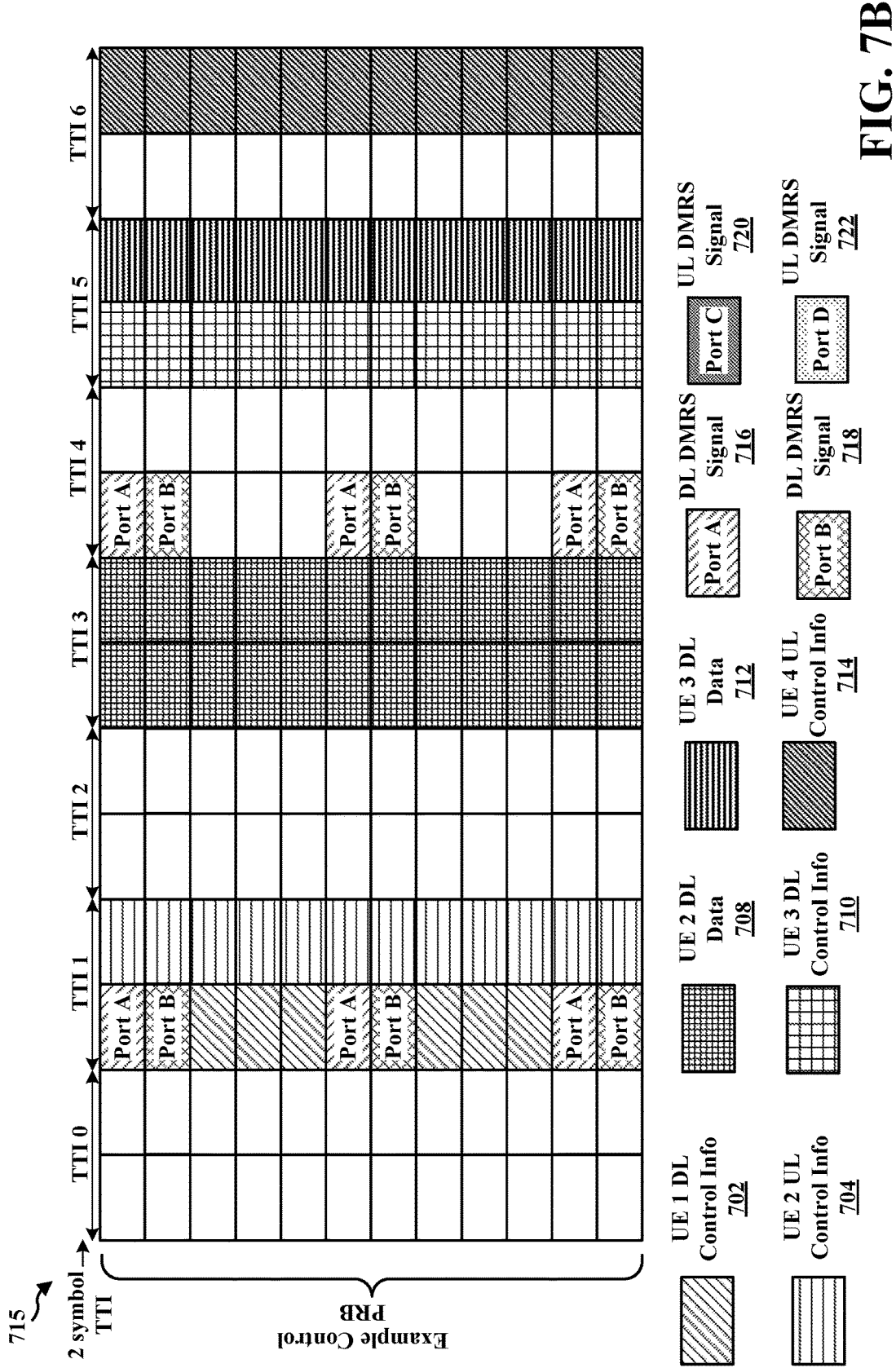
FIG. 7B illustrates an open-loop precoding structure in accordance with certain aspects of the present disclosure.

FIG. 7B illustrates a control PRB 715 in which the DMRS location is defined with an open-loop precoding structure. Seven different TTIs (e.g., TTI 0, TTI 1, TTI 2, TTI 3, TTI 4, TTI 5, and TTI 6) that each include two symbols are illustrated in the control PRB 715 of FIG. 7B. The control PRB 715 may include UE 1 DL control information 702, UE 2 UL control information 704, UE 2 DL data 708, UE 3 DL control information 710, UE 3 DL data 712, and UE 4 UL control information 714.

In the open-loop precoding structure illustrated in FIG. 7B, DMRS pilot signals may be received at one or more predetermined positions (e.g., TTI 1 and TTI 4). In other words, the location of the DMRS may be defined by the open-loop structure. The UE 406 may be informed that the open-loop precoding structure (e.g., the location of the DMRS and a repetition cycle of the DMRS) is used via higher layer signaling (e.g., RRC signaling). A UE receiving DL data in a particular TTI may use a previously received DMRS pilot signal (e.g., a past allocation of DMRS pilot signals) for demodulation of the control information in the particular TTI in which the UE is receiving DL data.

In an aspect, a single set of ports (e.g., port A 716 and port B 718) may be needed when using the open-loop precoding structure. In the example illustrated in FIG. 7B, port A 716 and port B 718 may be located in the first symbol of each of TTI 1 and TTI 4. The UE control information (e.g., for one or more of DL or UL) may use a precoded cycling pattern known by both the UE 406 and the eNB 404. In other words, control information in the control PRB 715 may be precoded using a pre-defined cycling pattern. In an aspect, the precoded cycling may be a function of the PRB and REs.

The control region in TTI 3 includes resources used for receiving UE 2 DL data 708 and may be allocated by a DL grant in different PRB that is not illustrated in FIG. 7B. The control region in TTI 3 may be demodulated using the DMRS signals received in the same PRB in ports of one or more previous TTIs.

In a scenario in which no UL grant is received, as in TTI 5 (e.g., but which does include a DL grant), UE3 DL data 712 may be received in the second symbol of the control region of TTI 5. As illustrated in TTI 6, the control region may contain an UL grant and not a DL grant.

Referring again to FIG. 4, the content 407 may include control information and DL data that is received in a slot based TTI. A slot based TTI may include a TTI that spans a single slot. Additional details with respect to DL control information for slot based TTI is described infra with respect to FIGS. 8A, 8B, 8C, and 8D.

Figure 8A:
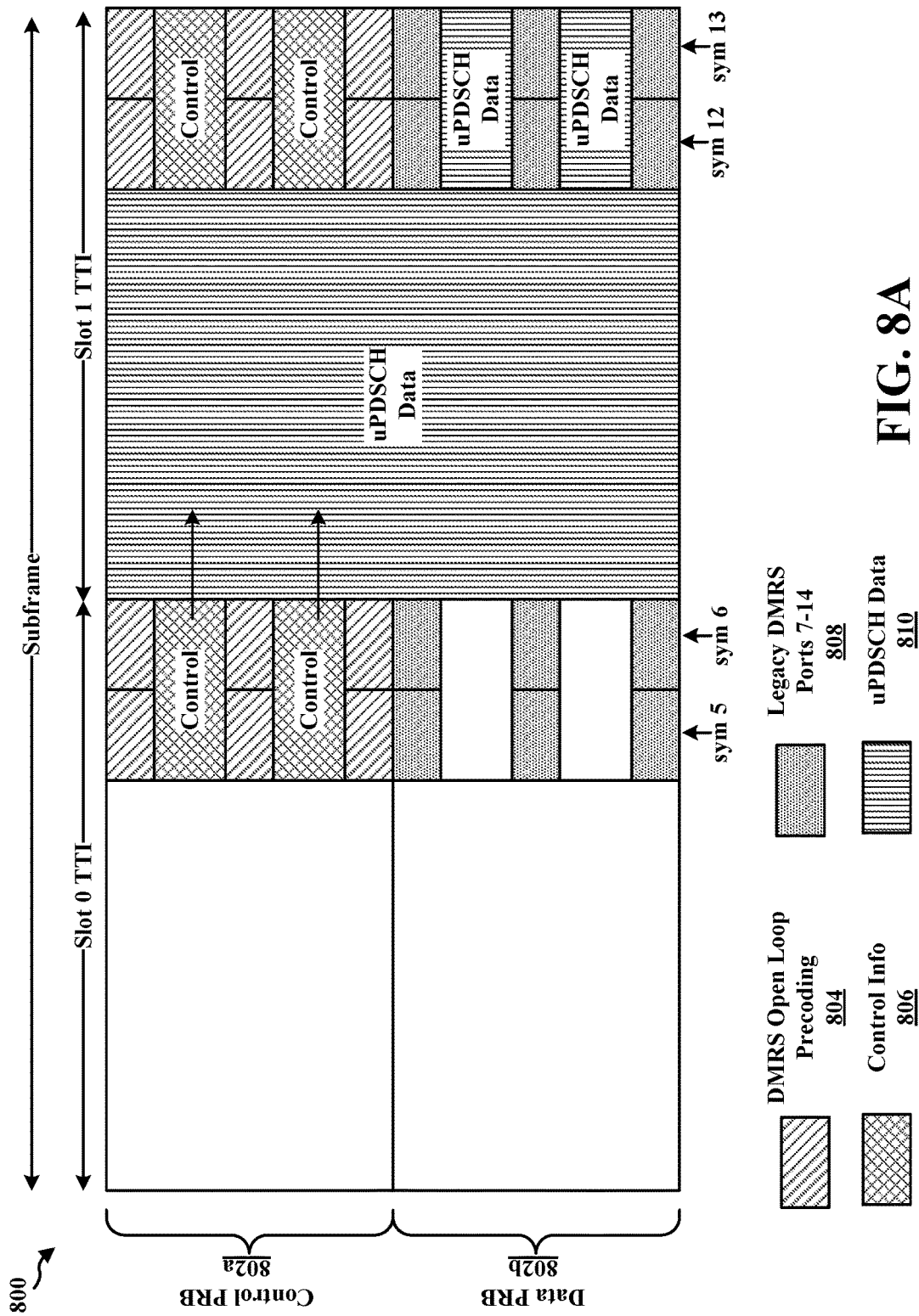
FIGS. 8A-8D illustrate a slot-based TTI in accordance with certain aspects of the present disclosure.

FIG. 8A illustrates a DL control information structure 800 in accordance with certain aspects of the present disclosure. For example, FIG. 8A depicts two ULL blocks that each include a control PRB 802*a* and a data PRB 802*b* located in a slot TTI. In the example illustrated in FIG. 8A, one ULL block may be located in TTI slot 0 of the subframe, and another ULL block is located in TTI slot 1 of the subframe. Each of TTI slot 0 TTI slot 0 and TTI slot 1 may include a control region located approximately at the end of each TTI. The control region may include DMRS open loop precoding signals 804 and control information 806.

In the example illustrated in FIG. 8A, TTI slot 0 may include DMRS open loop precoding signals 804 located in symbols 5 and 6. In TTI slot 1TTI slot 1, the DMRS open loop precoding signals 804 may be located in symbols 12 and 13. Control information 806 is placed adjacent (e.g., carried by adjacent subcarriers) to the DMRS open loop precoding signals 804 in symbols 5, 6, 12, and 13.

In the control PRB 802*a*, the DMRS structure may use DMRS open loop precoding. In the data PRB 802*b*, the DMRS structure may include legacy DMRS ports 7-14 808 in symbols 5, 6, 12, and 13. In the example illustrated in FIG. 8A, resources are scheduled using an allocation of control information 806 in slot N to provide a resource grant in slot N+1. For example, the allocation of control information 806 in TTI slot 0 provides the resource grant for ULL PDSCH (uPDSCH) data 810 in TTI slot 1. Similarly, the allocation of control information 806 in TTI slot 1 may provide a resource grant for uPDSCH data in a subsequent slot not illustrated in FIG. 8A. The UE 406 may use open loop precoding to demodulate the uPDSCH data 810 located in the control PRB 802*a*. The location of the control information 806 in FIG. 8A may be fixed, and hence may not be optimized via rate matching.

Figure 8B:
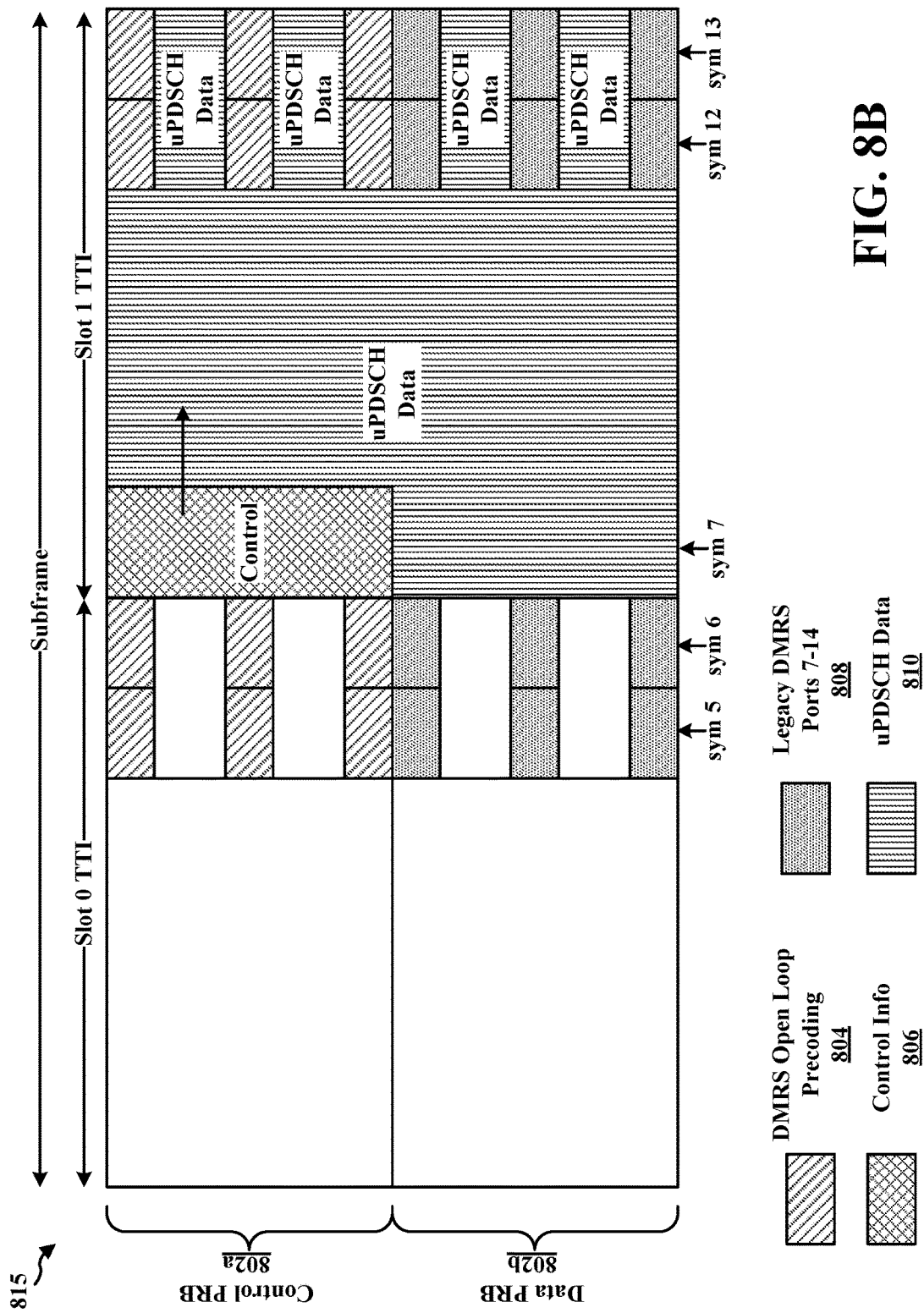

FIG. 8B illustrates a DL control information structure 815 in accordance with certain aspects of the present disclosure. For example, FIG. 8B depicts two ULL blocks that each include a control PRB 802*a* and a data PRB 802*b* located in a slot TTI. One ULL block may be located in TTI slot 0 of the subframe, and another ULL block may be located in TTI slot 1 of the subframe. In the control PRB 802*a*, the DMRS structure may include DMRS open loop precoding signals 804. In the data PRB 802*b*, the DMRS structure may include legacy DMRS ports 7-14 808.

Each of TTI slot 0 and TTI slot 1 may include a control region. The control region in TTI slot 0 may include DMRS open loop precoding signals 804 in symbols 5 and 6. The control region of TTI slot 1 may include DMRS open loop precoding signals 804 in symbols 12 and 13. Additionally, the control region of TTI slot 1 may include control information 806 at the front of the TTI (e.g., symbol 7).

The DL control information structure 815 illustrated in FIG. 8B may embed the control information 806 in the same slot TTI as the uPDSCH data 810 (e.g., at the front of slot 1). The control information 806 may provide rate matching information for the UE 406 to use in decoding the uPDSCH data 810. Having the control information 806 provide rate matching information may provide the advantage of early decoding of the uPDSCH data 810 and a reduced uPDSCH data 810 decoding processing time. The UE 406 may rely on the DMRS open loop precoding signals 804 from the previous slot (e.g., TTI slot 0) to perform an early decoding of the control information 806. In addition, the DL control information structure 815 illustrated in FIG. 8B may allow a resource allocation for the uPDSCH data 810 to be modified to account for a variable number of control grants.

Figure 8C:
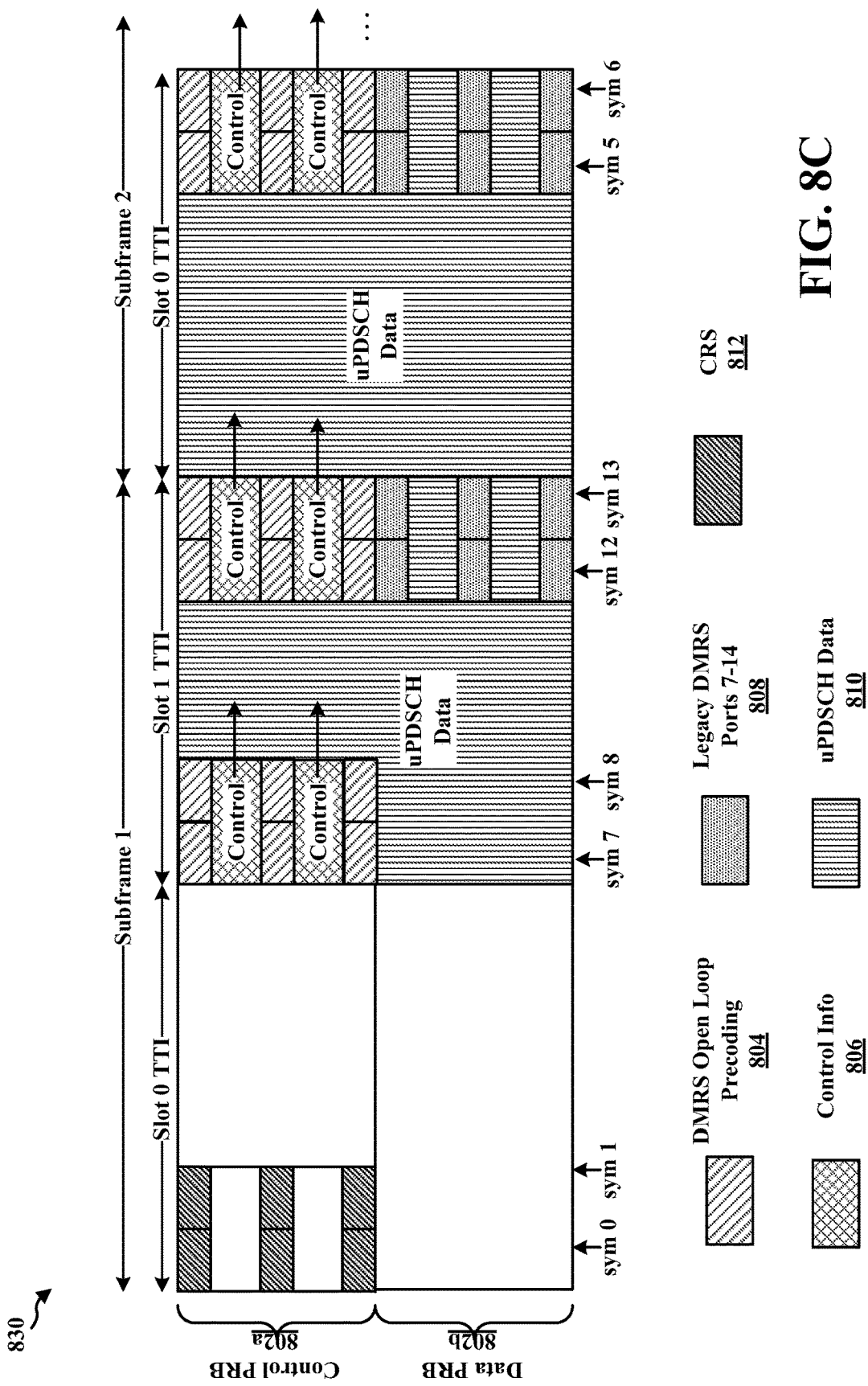

FIG. 8C illustrates a DL control information structure 830 in accordance with one aspect of the present disclosure. For example, FIG. 8C depicts three ULL blocks that each includes a control PRB 802*a* and a data PRB 802*b* located in a slot TTI. A first ULL block may be located in slot 0 of subframe 1, a second ULL block may be located in slot 1 of the subframe 1, and a third ULL block may be located in slot 0 of subframe 2. In the control PRB 802*a*, the DMRS structure may include DMRS open loop precoding signals 804 in slot 1 of subframe 1 and slot 0 of subframe 2. In the data PRB 802*b*, the DMRS structure may include legacy DMRS ports 7-14 808 in TTI slot 1 of subframe 1 and TTI slot 0 of subframe 2. In the example illustrated in FIG. 8C, CRS transmissions 812 may be located in symbols 0 and 1 of slot 0 in subframe 1.

Since a CRS transmission 812 is received in slot 0 of subframe 1, a DMRS may not be transmitted in slot 0 of subframe 1. Hence, placing a DMRS in slot 0 of subframe 1 for demodulation of uPDSCH data 810 in slot 1 of subframe 1 may not be optimal. Instead, front loaded DMRS open loop precoding signals 804 and control information 806 may be located in slot 1 of subframe 1 (e.g., located in symbols 7 and 8). The front loaded DMRS open loop precoding signals 804 and control information 806 may be used to demodulate the uPDSCH data 810 located in slot 1 of subframe 1. In an aspect, the MCS for the uPDSCH data 810 in slot 1 of subframe 1 may be constrained so for higher reliability. For example, a lower MCS may provide additional redundancy at the expense of data rate thus increasing the probability of a successful transmission. In addition, the higher the MCS the less redundancy in the data and fewer errors may be tolerated. In addition, slot 1 of subframe 1 may include back-end DMRS open loop precoding signals 804 and control information 806 (e.g., located in symbols 12 and 13). The back-end DMRS open loop precoding signals 804 and control information 806 may be used to demodulate the uPDSCH data 810 in slot 0 of subframe 2.

Figure 8D:
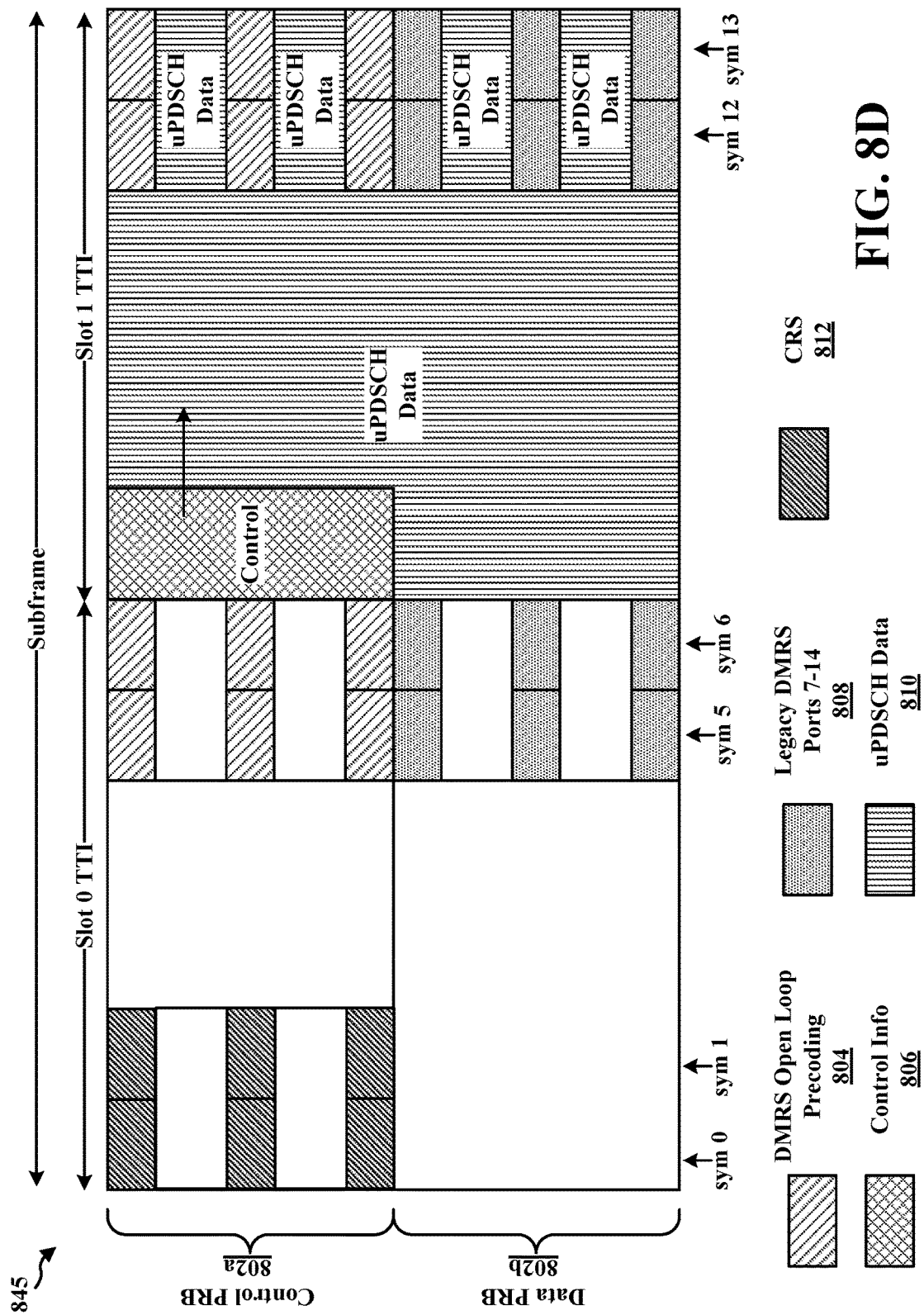

FIG. 8D illustrates a DL control information structure 845 in accordance with one aspect of the present disclosure. For example, FIG. 8D depicts two ULL blocks that each include a control PRB 802*a* and a data PRB 802*b* located in a slot TTI. One ULL block may be located in TTI slot 0 of the subframe, and another ULL block may be located in TTI slot 1 of the subframe. In the control PRB 802*a*, the DMRS structure may include DMRS open loop precoding signals 804. In the data PRB 802*b*, the DMRS structure may include legacy DMRS ports 7-14 808.

Each of TTI slot 0 and TTI slot 1 may include a control region. The control region in TTI slot 0 may include DMRS open loop precoding signals 804 in symbols 5 and 6. The control region of TTI slot 1 may include DMRS open loop precoding signals 804 in symbols 12 and 13. Additionally, the control region of TTI slot 1 includes control information 806 at the front of the TTI (e.g., symbol 7). Furthermore, CRS transmissions 812 may be located in symbols 0 and 1 of slot 0 in subframe 1.

The DL control information structure 845 illustrated in FIG. 8D may embed the control information 806 in the same slot TTI as the uPDSCH data 810 (e.g., at the front of slot 1). Additionally and/or alternatively, the CRS transmission 812 may be used in demodulation of uPDSCH data 810. The control information 806 may provide rate matching information for the UE 406 to use in decoding the uPDSCH data 810. Having the control information 806 provide rate matching information may provide the advantage of early decoding of the uPDSCH data 810 and a reduced uPDSCH decoding processing time. The UE 406 may rely on the DMRS open loop precoding signals 804 from the previous slot (e.g., TTI slot 0) to perform an early decoding of the control information 806. In addition, the DL control information structure 845 illustrated in FIG. 8D may allow a resource allocation for the uPDSCH data 810 to be modified to account for a variable number of control grants.

Figure 9:
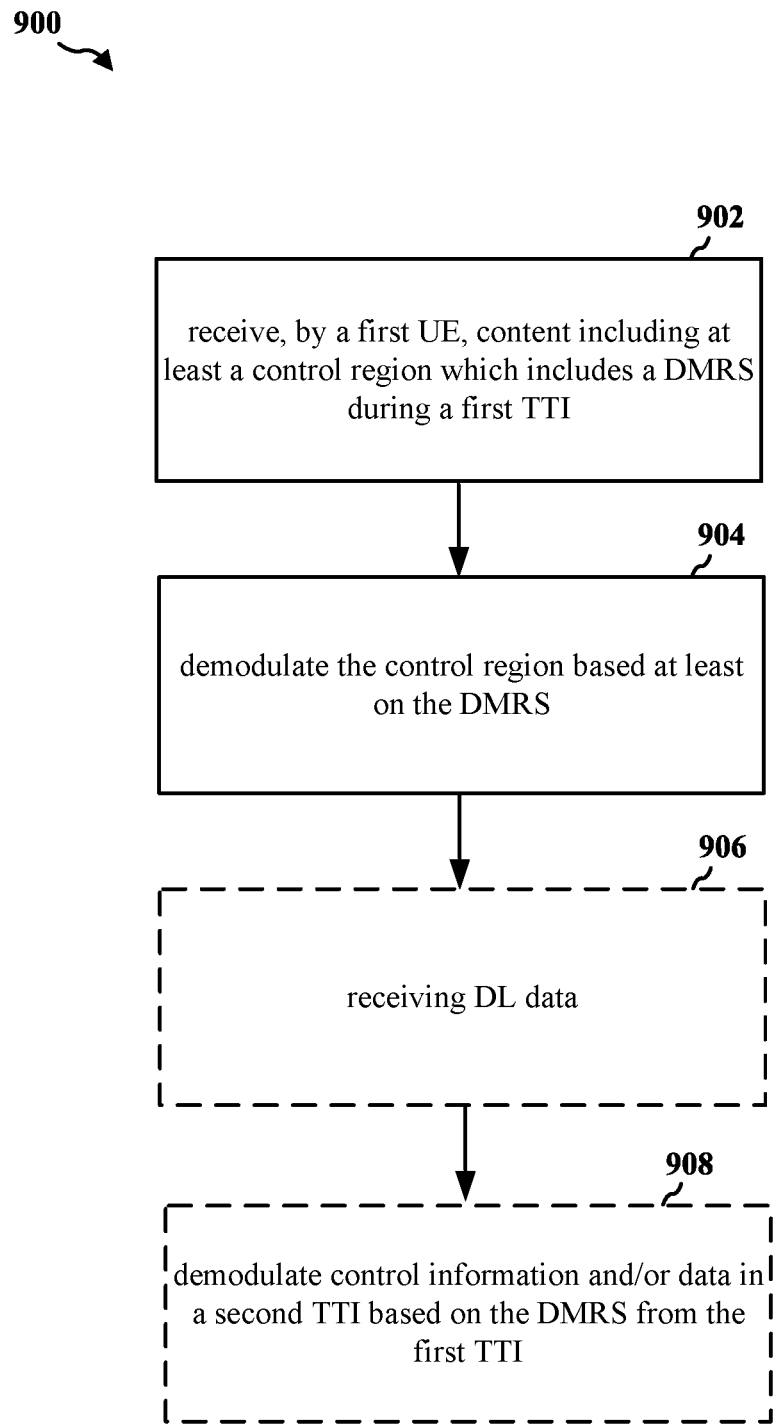
FIG. 9 is a flowchart of a method of wireless communication.

FIG. 9 is a flowchart 900 of a method of wireless communication. The method may be performed by a UE (e.g., UE 104, 152, 350, 406, the apparatus 1002/1002'). In FIG. 9, optional operations are indicated with dashed lines.

At 902, the UE may receive a first content during a first TTI. In one aspect, the first content may include at least a control region with a DMRS. In another aspect, a location of the DMRS may be defined by either a closed-loop precoding structure or an open-loop precoding structure. In addition, the duration of the first TTI may be shorter than 1 ms. Still further, the control region may also include one or more DL grants or UL data grants. Additionally, the one or more DL grants or UL data grants may include a first grant associated with a first data region for the first UE and a second grant associated with a second data region for a second UE. In one configuration, the first and second UEs may be different. The DL grant or UL data grant of the one or more DL grants or UL data grants may be mapped to the received DMRS. Further, the one or more DL grants or UL data grants may be associated with one or more data regions. In one aspect, a DL grant of the DL or UL grant may be received at approximately a beginning of the TTI, and an UL grant of the DL or UL grant may be received at approximately at an end of the TTI. For example, referring to FIG. 6B, the single slot TTI 615 may include a DL grant 602*a* for UE 1 and an UL grant 602*b* in control region R1 (e.g., Control R1). The DL grant 602*a* may include rate matching information for corresponding data region R1 602*b* (e.g., Data R1). In the example illustrated in FIG. 6B, the DL grant 602*a* may include X number of PRBs in Control R1 and the UL grant 602*c* may include Y number of PRBs in Control R1. Thus, Control R1 includes X+Y number of PRBs. Here, X and Y may be the same number of PRBs or a different number of PRBs. The Data R1 602*b* may include Z−Y PRBs. In another example, referring to FIG. 6D, the two symbol TTI 645 may include a DL grant 602*a* for UE 1 in control region R1 (e.g., Control R1) located in the first symbol in the two symbol TTI 645 (e.g., at the start of the two symbol TTI 645), and an UL grant 602*c* for UE 2 in Control R1 is located in the second symbol of the two symbol TTI 645. By positioning the DL grant 602*a* at the start of the two symbol TTI 645 and the UL grant 602*c* at the end of the TTI, a larger processing time for HARQ may be possible. In another aspect, the control region may include rate matching information for a corresponding data region. The duration of the first TTI may be two symbols, as illustrated in FIGS. 6C, 6D, 7A, and 7B. Alternatively, the duration of the first TTI may be a single slot, as illustrated in FIGS. 8A, 8B, 8C, and 8D. In another aspect, the location of the DMRS may defined by the closed-loop precoding structure (e.g., as illustrated in FIG. 7A). In an aspect, the location of the DMRS may be assigned based on CSI information sent from the UE. In another aspect, the control region may include a specific UL or DL grant for a first UE. Further, the first UE may be configured for MU-MIMO configurations such that the control region may be shared between the first UE and one or more other UEs. In one aspect, the control region may include a first region and a second region. In certain configurations, the first region may be assigned to the first UE thereby allowing the second region to be assigned to a different UE. For example, referring to FIG. 7A, separate users (e.g., UE 1 and UE 2) may be allocated resources for the DL (e.g., UE 1) and the UL (e.g., UE 2) in TTI 1. Therefore, separate ports are used for the DMRS pilot signals for UE 1 and UE 2. For example, DMRS pilot signals for UE 1 are received on port A 716 and port B 718, and DMRS pilot signals for UE 2 are received on port C 720 and port D 722. In another aspect, the first region may include a DL grant for the first UE and the second region including an UL grant for the first UE. For example, referring to FIG. 7A, a single user (e.g., UE 1) is being allocated resources for both the DL and UL. Here, DMRS pilot signals for the DL may be received on port A 716 and port B 718, and DMRS pilot signals for the UL may be received on port C 720 and port D 722. In a further aspect, the location of the DMRS may be a resource element which is mapped to a single port. For example, referring to FIG. 7A, the location of DMRS pilot signals may be a resource element which is mapped to a single port. For example, an RE for each of port A 716, port B 718, port C 720, and port D 722. In an additional aspect, the control region may include a DL grant for a second TTI. In certain configurations, the DL grant may allocate both control and data regions associated with the second TTI for DL data reception.

At 904, the UE may demodulate the control region based at least on the DMRS. For example, referring to FIG. 4, UE 406 may demodulate 409 the control region based at least on the DMRS.

At 906, the UE may receive DL data during the second TTI. For example, referring to FIG. 7A, a single user (e.g., UE 3) may be allocated resources for the DL. In the example illustrated in FIG. 7A, DMRS pilot signals may be received on a single port (e.g., port A 716). Since no UL grant may be present in TTI 5, UE 3 DL control information 710 may contain rate matching information to allocate UL control REs for UE 3 DL data 712. In one aspect, the location of the DMRS may be defined by the open-loop precoding structure. In another aspect, the location and repetition cycle of the DMRS may be pre-defined. For example, referring to FIG. 7B, DMRS pilot signals may be received at one or more predetermined positions (e.g., TTI 1 and TTI 4). In other words, the location of the DMRS may be defined by the open-loop precoding structure. The UE 406 may be informed of the use of the open-loop precoding structure (e.g., the location of the DMRS and the repetition cycle of the DMRS) via higher layer signaling (e.g., RRC signaling). In another aspect, the control region may include rate matching information for UL control resource elements. In another aspect, the control region may include a DL grant for a second TTI. The DL grant may allocate both control and data regions associated with the second TTI for DL data reception. For example, referring to FIG. 7B, in the case of no UL grant as in TTI 5 (e.g., but which does contain a DL grant), UE3 DL data 712 may be received in the second symbol of the control region of TTI 5. The UL grant and the DL grant for TTI 5 being in TTI 1 and/or TTI 4. In a further aspect, control information in the control region may be precoded using a pre-defined cycling pattern. The pre-defined cycling pattern may be based on at least one of PRB or RE assignments in the control region. For example, referring to FIG. 7B, one set of ports (e.g., port A 716 and port B 718) may be used when using the open-loop precoding structure. In the example illustrated in FIG. 7B, port A 716 and port B 718 may be placed in the first symbol of each of TTI 1 and TTI 4. The UE control information (e.g., for one or more of DL or UL) may use a precoding cycling pattern known by both the UE 406 and the eNB 404. In other words, control information in the control PRB 715 may be precoded using a pre-defined cycling pattern. In an aspect, the precoded cycling may be a function of the PRB and REs. In one aspect, the control region may be allocated to a region approximately at an end of the first TTI. In an aspect, the control information and the DMRS from the first TTI may be used to assist with demodulation of one or more grants to be used in a second TTI. The second TTI may immediately follow the first TTI. For example, referring to FIG. 8A, resources may be scheduled using an allocation of control information 806 in slot N to provide a resource grant in slot N+1. For example, the allocation of control information 806 in TTI slot 0 provides the resource grant for ULL PDSCH (uPDSCH) data 810 in TTI slot 1. Similarly, the allocation of control information 806 in TTI slot 1 may provide a resource grant for uPDSCH data in a subsequent slot not illustrated in FIG. 8A. The UE 406 may use open loop precoding to demodulate the uPDSCH data 810 located in the control PRB 802a. The location of the control information 806 in FIG. 8A may be fixed, and hence may not be optimized via rate matching.

At 908, the UE may demodulate control information in a second TTI based on the DMRS from the first TTI. In an aspect, the control information may be used to provide one or more grants in the second TTI. In another aspect, the second TTI may immediately follow the first TTI. In an additional aspect, the control information may be located at approximately a beginning of the second TTI. For example, referring to FIG. 8B, the DL control information structure 815 illustrated in FIG. 8B may embed the control information 806 in the same slot TTI as the uPDSCH data 810 (e.g., at the front of slot 1). The control information 806 may provide rate matching information for the UE 406 to use in decoding the uPDSCH data 810. Having control information 806 provide rate matching information may provide the advantage of early decoding of the uPDSCH data 810 with a reduced uPDSCH decoding processing time. The UE 406 may rely on the DMRS open loop precoding signals 804 from the previous slot (e.g., TTI slot 0) to perform an early decoding of the control information 806. In addition, the DL control information structure 815 illustrated in FIG. 8B may allow a resource allocation for the uPDSCH data 810 to be modified to account for a variable number of control grants. In one aspect, the first TTI may include a second DMRS. In another aspect, the second DMRS may be located at approximately a beginning of the first TTI. In a further aspect, the second DMRS may be used to assist with the demodulation. For example, referring to FIG. 8C, front loaded DMRS open loop precoding signals 804 and control information 806 may be located in slot 1 of subframe 1 (e.g., located in symbols 7 and 8). The front loaded DMRS open loop precoding signals 804 and control information 806 may be used to demodulate the uPDSCH data 810 located in slot 1 of subframe 1. In an aspect, the MSC for the uPDSCH data 810 in slot 1 of subframe 1 may be constrained so that the MCS has higher reliability. In addition, slot 1 of subframe 1 may include back-end DMRS open loop precoding signals 804 and control information 806 (e.g., located in symbols 12 and 13). The back-end DMRS open loop precoding signals 804 and control information 806 may be used to demodulate the uPDSCH data 810 in slot 0 of subframe 2. In another aspect, the first TTI may include a CRS that is used to assist with the demodulation. For example, referring to FIG. 8D, the DL control information structure 845 illustrated in FIG. 8D may embed the control information 806 in the same slot TTI as the uPDSCH data 810 (e.g., at the front of slot 1). Additionally and/or alternatively, the CRS transmission 812 may be used in demodulation of uPDSCH data 810. The control information 806 may provide rate matching information for the UE 406 to use in decoding the uPDSCH data 810. Having the control information 806 provide rate matching information may provide the UE 406 with the advantage of early decoding of the uPDSCH data 810 with a reduced uPDSCH decoding processing time. The UE 406 may rely on the DMRS open loop precoding signals 804 from the previous slot (e.g., TTI slot 0) to perform an early decoding of the control information 806. In addition, the DL control information structure 845 illustrated in FIG. 8D may allow a resource allocation for the uPDSCH data 810 to be modified to account for a variable number of control grants.

Figure 10:
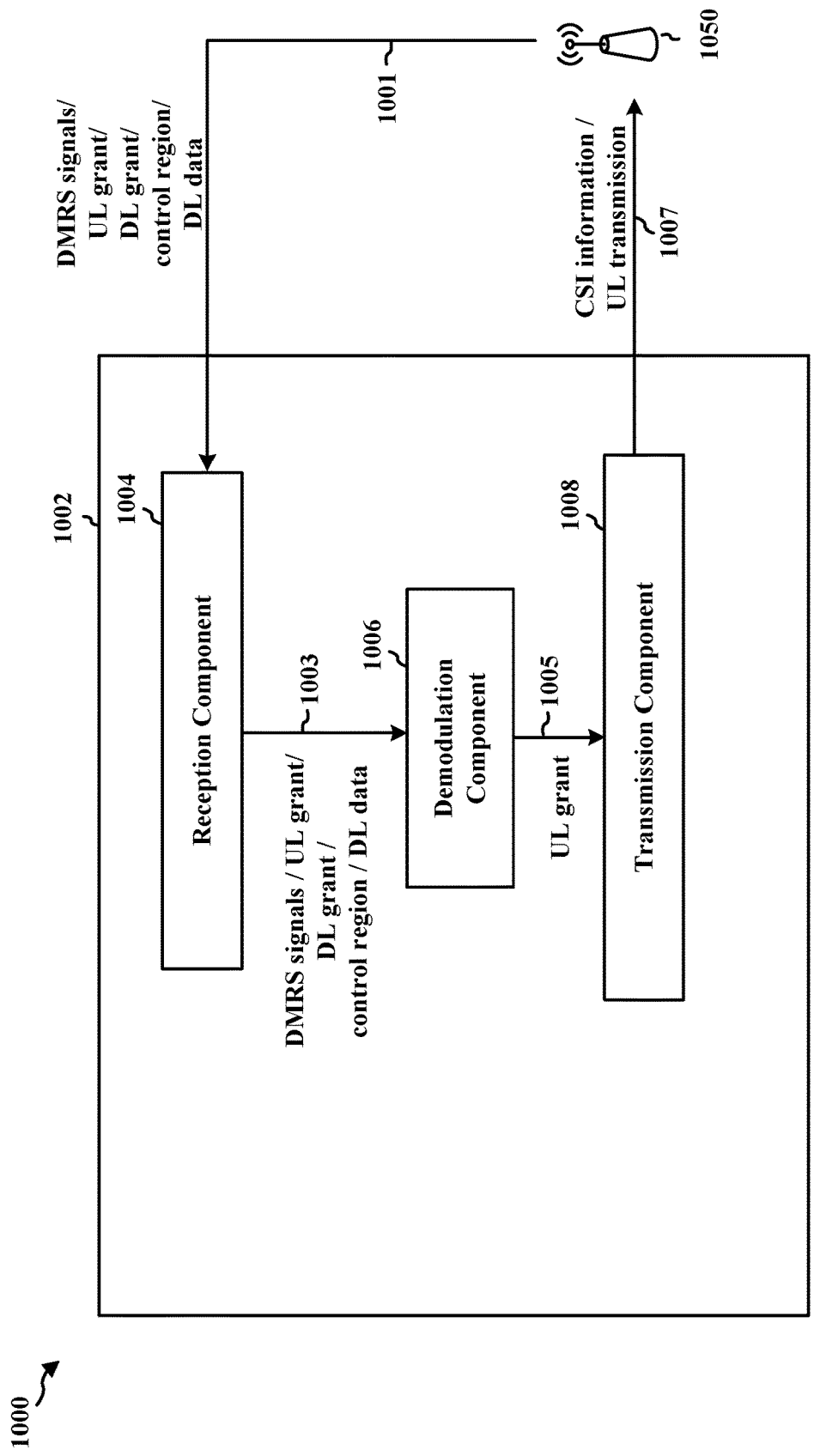
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE a UE (e.g., UE 104, 152, 350, 406, the apparatus 1002/1002') in communication with an eNB 1050 (e.g., eNB 102, 310, 404, base station 180). The apparatus may include a reception component 1004, a demodulation component 1006, and a transmission component 1008. The reception component 1004 may receive content during a first TTI. In one aspect, the content may include at least a control region that has one or more DMRS 1001. In another aspect, the control region may include one or more DL or UL data grants 1001. In a further aspect, the one or more DL or UL data grants 1001 may include a first grant associated with a first data region for the first UE and a second grant associated with a second data region for a second UE. In one aspect, the first UE and the second UE may be different. In a further aspect, one DL grant 1001 or UL data grant 1001 of the one or more DL or UL data grants 1001 may be mapped to a received DMRS 1001. In one aspect, the one DL grant or UL grant 1001 may be associated with one or more data regions. In another aspect, the control region may include rate matching information for a corresponding data region. In a further aspect, a location of the DMRS 1001 may be defined by either a closed-loop precoding structure or an open-loop precoding structure. In a further aspect, a duration of the first TTI may be shorter than 1 ms. In one aspect, the duration of the first TTI may be two symbols or one slot. In a first configuration, the location of the DMRS may be defined by the closed-loop precoding structure. In a further aspect, a second content of the DMRS 1001 and the location of the DMRS 1001 may be assigned to the apparatus 1002 based on CSI information 1007 transmitted by transmission component 1008 to the eNB 1050. In another aspect, the control region may include a specific UL grant 1001 or DL grant 1001 for the apparatus 1002. In a further aspect, the apparatus may be configured for MU-MIMO configurations. In another aspect, the control region may be shared between the apparatus 1002 and one or more other apparatuses (e.g., not illustrated in FIG. 10). In one aspect, the control region may include a first region and a second region. The first region may be assigned to the apparatus thereby allowing the second region to be assigned to a different UE. In another aspect, the first region may include a DL grant 1001 for apparatus 1002 and the second region including an UL grant 1001 for the apparatus 1002. In a further aspect, the location of the DMRS 1001 may be an RE which is mapped to a single port. In one aspect, the control region may include a DL grant 1001 for a second TTI. In another aspect, the DL grant 1001 may allocate both control and data regions associated with the second TTI for DL data reception. The reception component 1004 may receive DL data 1001 during the second TTI. In another aspect, the control region may include rate matching information 1001 for UL control REs. In a second configuration, the location of the DMRS 1001 may be defined by the open-loop precoding structure. In one aspect, the location and a repetition cycle of the DMRS 1001 may be pre-defined. In another aspect, control information 1001 in the control region may be precoded using a pre-defined cycling pattern. In a further aspect, the pre-defined cycling pattern may be based on at least one of physical resource block or resource element assignments in the control region. In another aspect, the control region may include rate matching information for UL control REs. In addition, the reception component 1004 may send a signal 1003 associated with one or more of the DMRS, DL grant, UL grant, control information, and/or DL data to the demodulation component 1006. The demodulation component 1006 may demodulate the control region based at least on the signal 1003 associated with the DMRS. In addition, the demodulation component 1006 may demodulate the DL data using the DMRS received in the first TTI. Demodulation component 1006 and/or reception component 1004 may send a signal 1005 associated with the UL grant to transmission component 1008. Transmission component 1008 may transmit UL transmissions 1007 to the eNB 1050 based on the UL grant.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
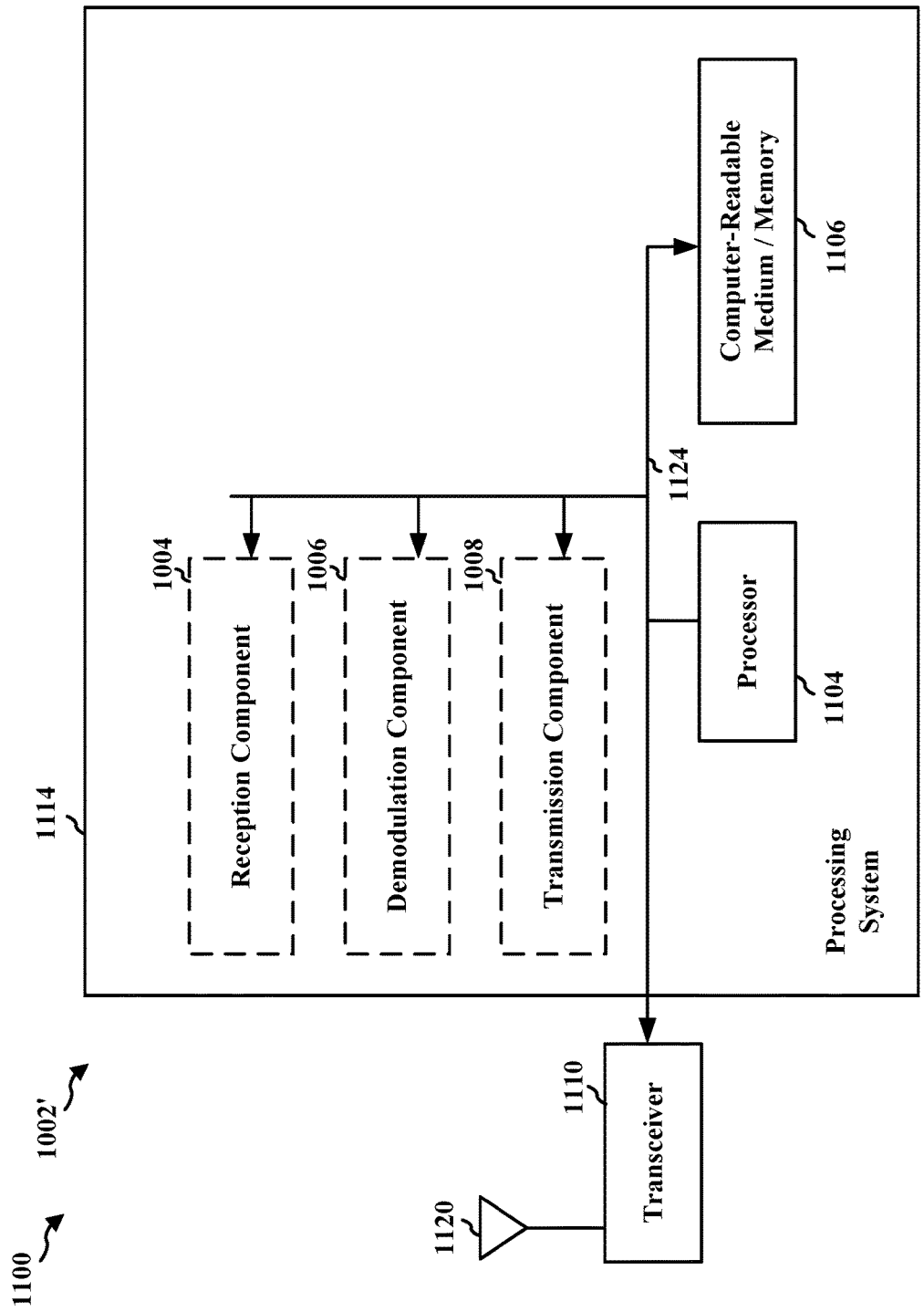
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication may include means for receiving, by a first UE, a first content during a first TTI. In an aspect, the content may include at least a control region which includes a DMRS. In another aspect, a location of the DMRS may be defined by either a closed-loop precoding structure or an open-loop precoding structure. In a further aspect, a duration of the first TTI may be shorter than 1 ms. In another configuration, the apparatus 1002/1002' for wireless communication may include means for demodulating the control region based at least on the DMRS. In an aspect, the control region may further include one or more DL or UL data grants. In an additional aspect, the one or more DL or UL data grants may include a first grant associated with a first data region for the first UE and a second grant associated with a second data region for a second UE. In a further aspect, the first UE and the second UE may be different. Additionally, one DL or UL data grant of the one or more DL or UL data grants may be mapped to a received DMRS. In another aspect, the one DL or UL grant may be associated with one or more data regions. In another aspect, a DL grant of the DL or UL grant may be received at approximately a beginning of the TTI. Still further, an UL grant of the DL or UL grant may be received at approximately at an end of the TTI. Moreover, the control region may include rate matching information for a corresponding data region. Furthermore, the duration of the first TTI may be two symbols. In another aspect, the duration of the first TTI may be one slot. Furthermore, the location of the DMRS may defined by the closed-loop precoding structure. In an additional aspect, a second content of the DMRS and the location of the DMRS may be assigned based on CSI information from the first UE. In still another aspect, the control region may include a specific UL or DL grant for the first UE. In yet another aspect, the first UE may be configured for MU-MIMO configurations. Still further, the control region may be shared between the first UE and one or more other UEs. In yet another aspect, the control region may include a first region and a second region. In a further aspect, the first region may be assigned to the first UE thereby allowing the second region to be assigned to a different UE. Additionally, the control region may include a first region and a second region. In another aspect, the first region may include a DL grant for the first UE and the second region including an UL grant for the first UE. In one aspect, the location of the DMRS may be an RE which may be mapped to a single port. In another aspect, the control region may include a DL grant for a second TTI. In a further aspect, the DL grant may allocate both control and data regions associated with the second TTI for DL data reception. In another configuration, the apparatus 1002/1002' for wireless communication may include means for receiving DL data during the second TTI. In a further configuration, the apparatus 1002/1002' for wireless communication may include means for demodulating the DL data using the DMRS received in the first TTI. In an aspect, the control region may include rate matching information for UL control REs. In another aspect, the location of the DMRS may be defined by the open-loop precoding structure. In a further aspect, the location and a repetition cycle of the DMRS may be pre-defined. In another configuration, the apparatus 1002/1002' for wireless communication may include means for receiving data during a second TTI. In a further configuration, the apparatus 1002/1002' for wireless communication may include means for demodulating the data based on the DMRS received in the first TTI. In a further aspect, control information in the control region may be precoded using a pre-defined cycling pattern. In another aspect, the pre-defined cycling pattern may be based on at least one of physical resource block or resource element assignments in the control region. In a further aspect, the control region may include a DL grant for a second TTI, the DL grant allocating both control and data regions associated with the second TTI for DL data reception. In another configuration, the apparatus 1002/1002' for wireless communication include means for receiving data during the second TTI. In an aspect, the control region may include rate matching information for UL control resource elements. In a further aspect, the control region may be allocated to a region approximately at an end of the first TTI. In an aspect, control information and the DMRS from the first TTI are used to assist with demodulation of one or more grants to be used in a second TTI, the second TTI immediately follows the first TTI. In another aspect, the first TTI further may include a second DMRS, the second DMRS being located at approximately a beginning of the first TTI. In a further aspect, the second DMRS may be used to assist with demodulation. In another configuration, the apparatus 1002/1002' for wireless communication may include means for demodulating control information in a second TTI based on the DMRS from the first TTI, the control information may be used to provide one or more grants in the second TTI, the second TTI immediately follows the first TTI, and the control information being located at approximately a beginning of the second TTI. In an aspect, the first TTI further may include a CRS. In a further aspect, the CRS may be used to assist with the demodulation. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving, by a first user equipment (UE), a first content during a first transmission time interval (TTI), the first content including at least a control region which includes a demodulation reference signal (DMRS), a location of the DMRS being defined by either a closed-loop precoding structure or an open-loop precoding structure, a duration of the first TTI being shorter than 1 ms, the control region further including a downlink (DL) grant for a second TTI, and the DL grant allocating both control and data regions associated with the second TTI for DL data reception;

demodulating the control region based at least on the DMRS;

receiving DL data during the second TTI; and demodulating the DL data using the DMRS received in the first TTI.

2. The method of claim 1, wherein the control region further includes one or more downlink (DL) grants or uplink (UL) data grants for the first TTI.

3. The method of claim 2, wherein the one or more DL grants or UL data grants include a first grant associated with a first data region for the first UE and a second grant associated with a second data region for a second UE, the first UE and the second UE being different.

4. The method of claim 3, wherein one DL grant or one UL data grant of the one or more DL grants or UL data grants is mapped to a received DMRS.

5. The method of claim 4, wherein the one DL grant or the one UL grant is associated with one or more data regions.

6. The method of claim 1, wherein the control region includes rate matching information for a corresponding data region.

7. The method of claim 1, wherein the duration of the first TTI is two symbols or one slot.

8. The method of claim 1, wherein a second content of the DMRS and the location of the DMRS is assigned based on channel state information (CSI) information from the first UE.

9. The method of claim 1, wherein the control region includes a specific uplink (UL) grant or a downlink (DL) grant for the first UE.

10. The method of claim 1, wherein the first UE is configured for multi-user multiple input multiple output (MU-MIMO) configurations, and wherein the control region is shared between the first UE and one or more other UEs.

11. The method of claim 1, wherein the control region includes a first region and a second region, the first region being assigned to the first UE and the second region being assigned to a different UE.

12. The method of claim 1, wherein the control region includes a first region and a second region, the first region including a downlink (DL) grant for the first UE and the second region including an uplink (UL) grant for the first UE.

13. The method of claim 1, wherein the location of the DMRS is a resource element which is mapped to a single port.

14. The method of claim 1, wherein the control region includes rate matching information for UL control resource elements.

15. The method of claim 1, wherein the location of the DMRS is defined by the closed-loop precoding structure.

16. An apparatus for wireless communication, comprising:

means for receiving by a first user equipment (UE), a first content during a first tranmission time interval (TTI), the first content including at least a control region which includes a demodulation reference signal (DMRS), a location of the DMRS being defined by either a closed-loop precoding structure or an open-loop precoding structure, a duration of the first TTI being shorter than 1 ms, the control region further including a downlink (DL) grant for a second TTI, and the DL grant allocating both control and data regions associated with the second TTI for DL data reception;

means for demodulating the control region based at least on the DMRS;

means for receiving DL data during the second TTI; and means for demodulating the DL data using the DMRS received in the first TTI.

17. The apparatus of claim 16, wherein the control region further includes one or more downlink (DL) grants or uplink (UL) data grants for the first TTI.

18. The apparatus of claim 17, wherein the one or more DL or UL data grants include a first grant associated with a first data region for the first UE and a second grant associated with a second data region for a second UE, the first UE and the second UE being different.

19. The apparatus of claim 18, wherein one DL grant or UL data grant of the one or more DL or UL data grants is mapped to a received DMRS.

20. The apparatus of claim 18, wherein the one DL grant or UL grant is associated with one or more data regions.

21. The apparatus of claim 16, wherein the control region includes rate matching information for a corresponding data region.

22. The apparatus of claim 16, wherein the duration of the first TTI is two symbols or one slot.

23. The apparatus of claim 16, wherein a second content of the DMRS and the location of the DMRS is assigned based on channel state information (CSI) information from the first UE.

24. The apparatus of claim 16, wherein the control region includes a specific uplink (UL) or downlink (DL) grant for the first UE.

25. The apparatus of claim 16, wherein the first UE is configured for multi-user multiple input multiple output (MU-MIMO) configurations, and wherein the control region is shared between the first UE and one or more other UEs.

26. The apparatus of claim 16, wherein the control region includes a first region and a second region, the first region being assigned to the first UE and the second region being assigned to a different UE.

27. The apparatus of claim 16, wherein the control region includes a first region and a second region, the first region including a downlink (DL) grant for the first UE and the second region including an uplink (UL) grant for the first UE.

28. The apparatus of claim 16, wherein the location of the DMRS is a resource element which is mapped to a single port.

29. The apparatus of claim 16, wherein the control region includes rate matching information for UL control resource elements.

30. The apparatus of claim 16, wherein the location of the DMRS is defined by the closed-loop precoding structure.

31. An apparatus for wireless communication, comprising:

a memory; and at least one processor coupled to the memory and configured to:

receive, by a first user equipment (UE), a first content during a first transmission time interval (TTI), the first content including at least a control region which includes a demodulation reference signal (DMRS), a location of the DMRS being defined by either a closed-loop precoding structure or an open-loop precoding structure, a duration of the first TTI being shorter than 1 ms, the control region further including a downlink (DL) grant for a second TTI, and the DL grant allocating both control and data regions associated with the second TTI for DL data reception;

demodulate the control region based at least on the DMRS;

receive DL data during the second TTI; and demodulate the DL data using the DMRS received in the first TTI.

32. The apparatus of claim 31, wherein the control region further includes one or more downlink (DL) grants or uplink (UL) data grants for the first TTI.

33. The apparatus of claim 32, wherein the one or more DL or UL data grants include a first grant associated with a first data region for the first UE and a second grant associated with a second data region for a second UE, the first UE and the second UE being different.

34. The apparatus of claim 33, wherein one DL grant or UL data grant of the one or more DL or UL data grants is mapped to a received DMRS.

35. The apparatus of claim 34, wherein the one DL grant or UL grant is associated with one or more data regions.

36. The apparatus of claim 31, wherein the control region includes rate matching information for a corresponding data region.

37. The apparatus of claim 31, wherein the duration of the first TTI is two symbols or one slot.

38. The apparatus of claim 31, wherein a second content of the DMRS and the location of the DMRS is assigned based on channel state information (CSI) information from the first UE.

39. The apparatus of claim 31, wherein the control region includes a specific uplink (UL) or downlink (DL) grant for the first UE.

40. The apparatus of claim 31, wherein the first UE is configured for multi-user multiple input multiple output (MU-MIMO) configurations, and wherein the control region is shared between the first UE and one or more other UEs.

41. The apparatus of claim 31, wherein the control region includes a first region and a second region, the first region being assigned to the first UE and the second region being assigned to a different UE.

42. The apparatus of claim 31, wherein the control region includes a first region and a second region, the first region including a downlink (DL) grant for the first UE and the second region including an uplink (UL) grant for the first UE.

43. The apparatus of claim 31, wherein the location of the DMRS is a resource element which is mapped to a single port.

44. The apparatus of claim 31, wherein the control region includes rate matching information for UL control resource elements.

45. The apparatus of claim 31, wherein the location of the DMRS is defined by the closed-loop precoding structure.

46. A non-transitory computer-readable medium storing computer executable code, comprising code to:

receive, by a first user equipment (UE), a first content during a first transmission time interval (TTI), the first content including at least a control region which includes a demodulation reference signal (DMRS), a location of the DMRS being defined by either a closed-loop precoding structure or an open-loop precoding structure, a duration of the first TTI being shorter than 1 ms, the control region further including a downlink (DL) grant for a second TTI, and the DL grant allocating both control and data regions associated with the second TTI for DL data reception;

demodulation the control region based at least on the DMRS;

receive DL data during the second TTI; and demodulate the DL data using the DMRS received in the first TTI.

47. The computer-readable medium of claim 46, wherein the control region further includes one or more downlink (DL) grants or uplink (UL) data grants for the first TTI.

48. The computer-readable medium of claim 47, wherein the one or more DL or UL data grants include a first grant associated with a first data region for the first UE and a second grant associated with a second data region for a second UE, the first UE and the second UE being different.

49. The computer-readable medium of claim 48, wherein one DL grant or UL data grant of the one or more DL or UL data grants is mapped to a received DMRS.

50. The computer-readable medium of claim 49, wherein the one DL grant or UL grant is associated with one or more data regions.

51. The computer-readable medium of claim 46, wherein the control region includes rate matching information for a corresponding data region.

52. The computer-readable medium of claim 46, wherein the duration of the first TTI is two symbols or one slot.

53. The computer-readable medium of claim 46, wherein a second content of the DMRS and the location of the DMRS is assigned based on channel state information (CSI) information from the first UE.

54. The computer-readable medium of claim 46, wherein the control region includes a specific uplink (UL) or downlink (DL) grant for the first UE.

55. The computer-readable medium of claim 46, wherein the first UE is configured for multi-user multiple input multiple output (MU-MIMO) configurations, and wherein the control region is shared between the first UE and one or more other UEs.

56. The computer-readable medium of claim 46, wherein the control region includes a first region and a second region, the first region being assigned to the first UE and the second region being assigned to a different UE.

57. The computer-readable medium of claim 46, wherein the control region includes a first region and a second region, the first region including a downlink (DL) grant for the first UE and the second region including an uplink (UL) grant for the first UE.

58. The computer-readable medium of claim 46, wherein the location of the DMRS is a resource element which is mapped to a single port.

59. The computer-readable medium of claim 46, wherein the control region includes rate matching information for UL control resource elements.

60. The computer-readable medium of claim 46, wherein the location of the DMRS is defined by the closed-loop precoding structure.

* * * * *